(12) United States Patent
Jafarian et al.

(10) Patent No.: US 9,549,371 B2
(45) Date of Patent: Jan. 17, 2017

(54) ACCESS POINT PROXY AND MULTI-HOP WIRELESS COMMUNICATION

(71) Applicant: Qualcomm Incorporated, San Diego, CA (US)

(72) Inventors: Amin Jafarian, San Diego, CA (US); George Cherian, San Diego, CA (US); Santosh Paul Abraham, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 13/830,873

(22) Filed: Mar. 14, 2013

(65) Prior Publication Data

US 2014/0269360 A1    Sep. 18, 2014

(51) Int. Cl.
    *H04W 52/02* (2009.01)
    *H04W 40/22* (2009.01)
    *H04W 88/04* (2009.01)
    *H04L 1/16* (2006.01)

(52) U.S. Cl.
    CPC ............ *H04W 52/0209* (2013.01); *H04L 1/16* (2013.01); *H04W 40/22* (2013.01); *H04W 88/04* (2013.01)

(58) Field of Classification Search
    CPC .......... H04L 1/16; H04L 1/1642; H04W 40/22
    See application file for complete search history.

(56) References Cited

U.S. PATENT DOCUMENTS

| | | | |
|---|---|---|---|
| 6,975,647 B2 | 12/2005 | Neale et al. | |
| 7,072,979 B1* | 7/2006 | Aviani et al. | 709/239 |
| 7,165,112 B2 | 1/2007 | Battin et al. | |
| 7,386,009 B2 | 6/2008 | Reddy et al. | |
| 7,596,144 B2 | 9/2009 | Pong | |
| 2002/0191600 A1* | 12/2002 | Shah et al. | 370/389 |
| 2003/0108031 A1* | 6/2003 | Inden | 370/352 |
| 2006/0098616 A1* | 5/2006 | Kish | H04L 1/1607 370/338 |
| 2006/0221827 A1* | 10/2006 | Makhervaks et al. | 370/230 |

(Continued)

OTHER PUBLICATIONS

Yong Huang, Weibo Gong, Don Towsley, Application layer relays for wireless 802.11 mesh networks, Proceedings of the 2nd IEEE Workshop on Wireless Mesh Networks 2006, pp. 1-10.*

(Continued)

*Primary Examiner* — Christopher Crutchfield
(74) *Attorney, Agent, or Firm* — Knobbe, Martens, Olson & Bear, LLP

(57) ABSTRACT

Methods and devices for communicating data in a wireless communications network are described herein. In one aspect, network layers are offloaded from a station to an access point. In another aspect, flow control is introduced between the station and access point. In another aspect, segmentation is introduced between the station and access point. In another aspect, keep alive is introduced between the station and access point. In another aspect, in addition to MAC layer sequencing and acknowledging, additional sequencing and acknowledging is performed between the station and access point to ensure reliable transmission of data. In another aspect, MAC layer sequencing and acknowledging is disabled. In another aspect, a last MPDU fragment is used to ensure reliable transmission of data.

17 Claims, 21 Drawing Sheets

(56) References Cited

U.S. PATENT DOCUMENTS

| | | | |
|---|---|---|---|
| 2007/0011375 A1* | 1/2007 | Kumar | 710/106 |
| 2011/0170559 A1* | 7/2011 | Zhang et al. | 370/442 |
| 2011/0194490 A1* | 8/2011 | Gandham | H04W 80/06 370/328 |
| 2011/0317702 A1* | 12/2011 | Ho | 370/392 |
| 2012/0063449 A1 | 3/2012 | Frederic et al. | |
| 2013/0155938 A1* | 6/2013 | Smith et al. | 370/315 |
| 2014/0105078 A1* | 4/2014 | Zhu et al. | 370/281 |

OTHER PUBLICATIONS

Author Unknown, RFC 793, Transmission Control Protocol, pp. 1-85, 1981.*

Author Unknown, Congestion Control in IP/TCP Internetworks, pp. 1-9, 1984.*

Author Unknown, Piggybacking, p. 1, as retrieved from The Internet Archive, www.archive.org, on Dec. 15, 2007, p. 1.*

* cited by examiner

ACCESS POINT PROXY AND MULTI-HOP WIRELESS COMMUNICATION

BACKGROUND

Field

The present application relates generally to wireless communications. More specifically, the disclosure is directed to methods and devices for improving the communications in a wireless communication network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. TCP/IP protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units or data frames. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Accordingly, the header information is transmitted with packets. Such header information may comprise a large portion of a data packet. In addition, certain overhead information included in these packets increases the overall number of transmissions which results in increased power consumption. Thus, improved methods and devices for exchanging messages between spatially-separated devices are desired.

SUMMARY

The methods and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect includes a method of communicating data in a wireless communications network. The method includes generating a message including a link identifier that identifies an encapsulated TCP/IP protocol communication and transmitting the generated message to a relay. The method further includes receiving an acknowledgment message from the relay, the acknowledgment message including identifying the link identifier.

Another aspect disclosed includes a device for communicating data in a wireless communications network. The device includes a processor configured to generate a message including a link identifier that identifies an encapsulated TCP/IP protocol communication. The device further includes a transmitter configured to transmit the generated message to a relay. The device further includes a receiver configured to receive an acknowledgment message from the relay, the acknowledgment message including identifying the link identifier.

Another aspect disclosed includes a computer-readable medium comprising instructions that when executed by a computer cause the computer to perform a method of communicating in a wireless network. The method includes generating a message including a link identifier that identifies an encapsulated TCP/IP protocol communication and transmitting the generated message to a relay. The method further includes receiving an acknowledgment message from the relay, the acknowledgment message including identifying the link identifier.

Another aspect disclosed includes a device for communicating data in a wireless communications network. The device includes means for generating a message including a link identifier that identifies an encapsulated TCP/IP protocol communication. The device further includes means for transmitting the generated message to a relay and means for receiving an acknowledgment message from the relay, the acknowledgment message including identifying the link identifier.

Another aspect disclosed includes a method of communicating data in a wireless communications network. The method includes determining a reliability of a link to a device and selectively modifying an acknowledgment flag based on the reliability of the link. The method further includes transmitting a message including the acknowledgment flag to the device.

Another aspect disclosed includes a device for communicating data in a wireless communications network. The device includes a processor configured to determine a reliability of a link to a device and to selectively modify an acknowledgment flag based on the reliability of the link. The device further includes a transmitter configured to transmit a message including the acknowledgment flag to the device.

Another aspect disclosed includes a computer-readable medium comprising instructions that when executed by a computer cause the computer to perform a method of communicating in a wireless network. The method includes determining a reliability of a link to a device and selectively modifying an acknowledgment flag based on the reliability of the link. The method further includes transmitting a message including the acknowledgment flag to the device.

Another aspect disclosed includes a device for communicating data in a wireless communications network. The device includes means for determining a reliability of a link to a device and to selectively modify an acknowledgment flag based on the reliability of the link. The device further includes means for transmitting a message including the acknowledgment flag to the device.

Another aspect disclosed includes a method of communicating data in a wireless communications network. The method includes setting a last flag in a header of a protocol data unit and transmitting the protocol data unit to a downstream device. The method further includes receiving an acknowledgment from the downstream device of the protocol data unit and transmitting, in response to receiving the acknowledgment, an upstream acknowledgment to an upstream device.

Another aspect disclosed includes a device for communicating data in a wireless communications network. The device includes a processor configured to set a last flag in a header of a protocol data unit. The device further includes a transmitter configured to transmit the protocol data unit to a downstream device and to transmit, in response to receiving an acknowledgment of the protocol data unit from the downstream device, an upstream acknowledgment to an upstream device.

Another aspect disclosed includes a computer-readable medium comprising instructions that when executed by a computer cause the computer to perform a method of communicating in a wireless network. The method includes setting a last flag in a header of a protocol data unit and transmitting the protocol data unit to a downstream device. The method further includes receiving an acknowledgment from the downstream device of the protocol data unit and transmitting, in response to receiving the acknowledgment, an upstream acknowledgment to an upstream device.

Another aspect disclosed includes a device for communicating data in a wireless communications network. The device includes means for setting a last flag in a header of a protocol data unit. The device further includes means for transmitting the protocol data unit to a downstream device and to transmit, in response to receiving an acknowledgment of the protocol data unit from the downstream device, an upstream acknowledgment to an upstream device.

DETAILED DESCRIPTION

Figure 1:
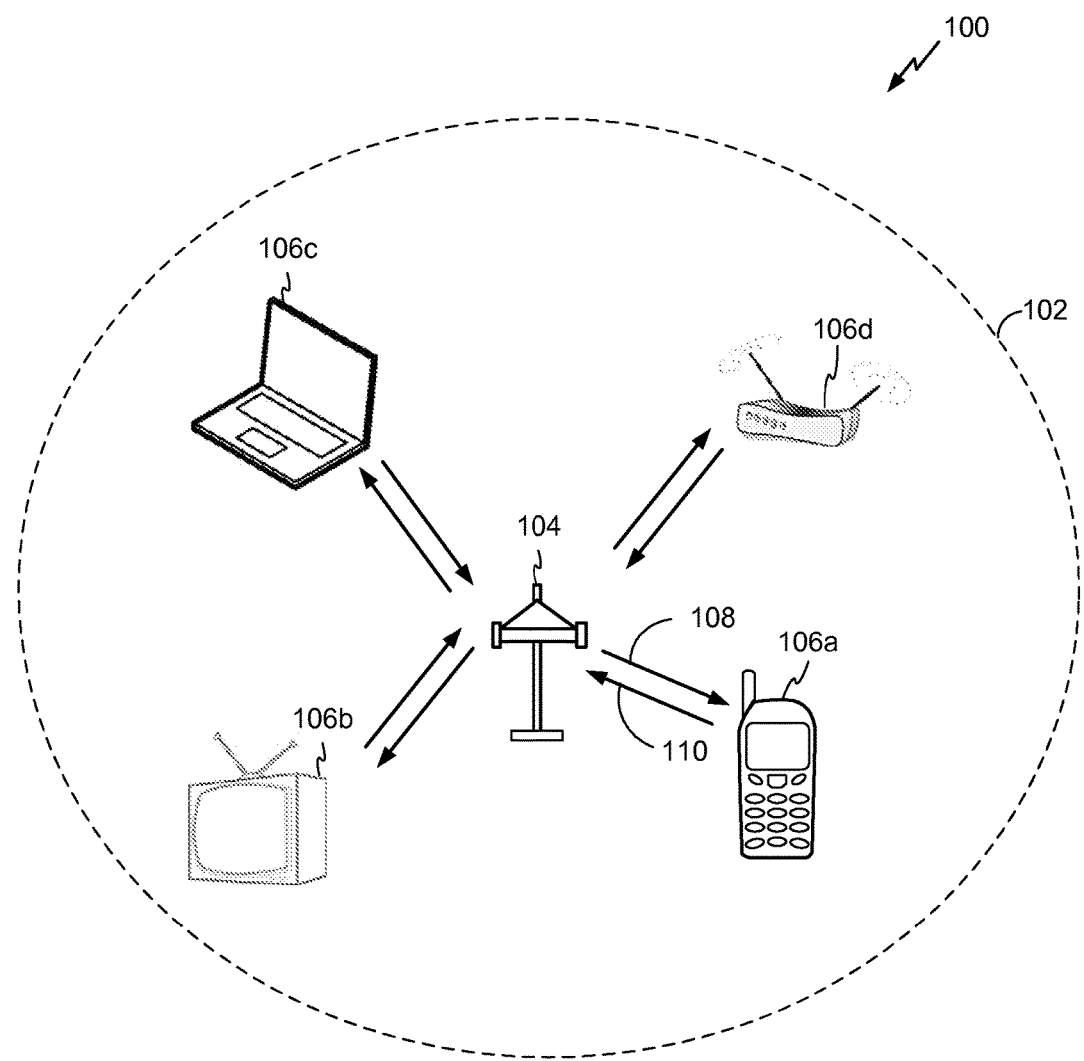
FIG. 1 illustrates an exemplary wireless communication system in which aspects of the present disclosure may be employed.

Hardware and software designers seek to minimize the amount of power consumed by most modern electronic devices. Where devices communicate wirelessly, the number of transmissions increases the overall amount of power consumed. Meanwhile, where overhead transmissions (e.g., those that support application data transfer) make up a majority of the overall number of transmissions, overall power consumption may increase with marginal benefit to the user. In various aspects of the present disclosure, methods and devices are disclosed to reduce the number of overhead transmissions while ensuring reliable transport of application data.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communication, a combination of OFDM and DSSS communication, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations, or STAs). In general, an AP may serve as a hub or base station for the WLAN and a STA serves as a user of the WLAN. For example, a STA may be a laptop computer, a personal digital assistant (PDA), a mobile phone, etc. In an example, a station (STA) connects to an AP via a WiFi (e.g., IEEE 802.11 protocol such as 802.11ah) compliant wireless link to obtain general connectivity to the Internet or to other wide area networks. In some implementations a STA may also be used as an AP.

An access point (AP) may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

A STA may also comprise, be implemented as, or known as an access terminal (AT), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communication.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
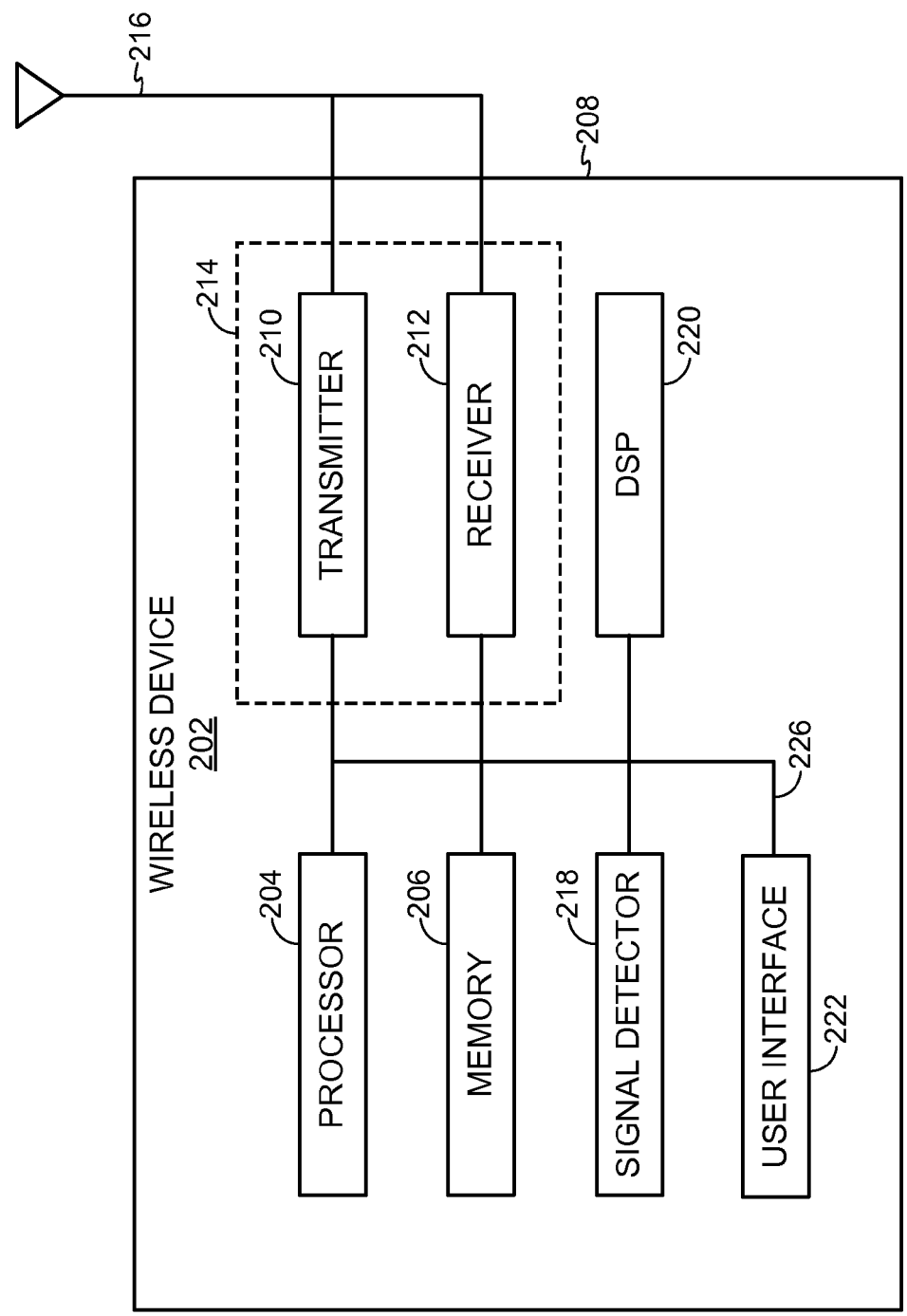
FIG. 2 is a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, one of the STAs 106, or one of the relays 320 and/or 330.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104, a STA 106, a relay 320, and/or an association relay 330, and may be used to transmit and/or receive communications. That is, either AP 104, STA 106, relay 320, or association relay 330 may serve as transmitter or receiver devices. Certain aspects contemplate signal detector 218 being used by software running on memory 206 and processor 204 to detect the presence of a transmitter or receiver.

In some embodiments, AP 104 and STA 106 may not be able to communicate properly with each other. For example, AP 104 and STA 106 may be able to communicate with each other, but at a lower than desired data rate. In another example, AP 104 and/or STA 106 may be out of a transmit range of the other such that AP 104 and STA 106 cannot communicate with each other. Another device, such as a relay, may be utilized to form a bridge between the AP 104 and the STA 106 such that they can communicate properly with each other. For example, a store and forward relay may receive messages from the AP 104 and/or STA 106, determine an intended recipient of the messages, and forward the messages to the intended recipient. Store and forward relays may reduce median packet transmit times by half.

In some embodiments, the communication between AP 104 and STA 106 may be intermittent. Because an access point 104 may have a greater transmit power than a station, in some embodiments, the station may be able to receive data transmitted by the access point, but the access point may be unable to receive data transmitted by the station. In these embodiments, a store and forward relay may receive messages from the AP 104 and/or STA 106. In some embodiments, the store and forward relay may determine whether data packets transmitted by the STA to the AP were received successfully by the AP. When the store and forward relay determines the packets were not successfully received by the AP 104, the store and forward relay may retransmit the packets to the access point. In some embodiments, the relay may also provide arbitration services between the access point and the station. For example, the access point or the station may perform a request to send message/clear to send message exchange with the relay before transmitting data to the other.

Figure 3:
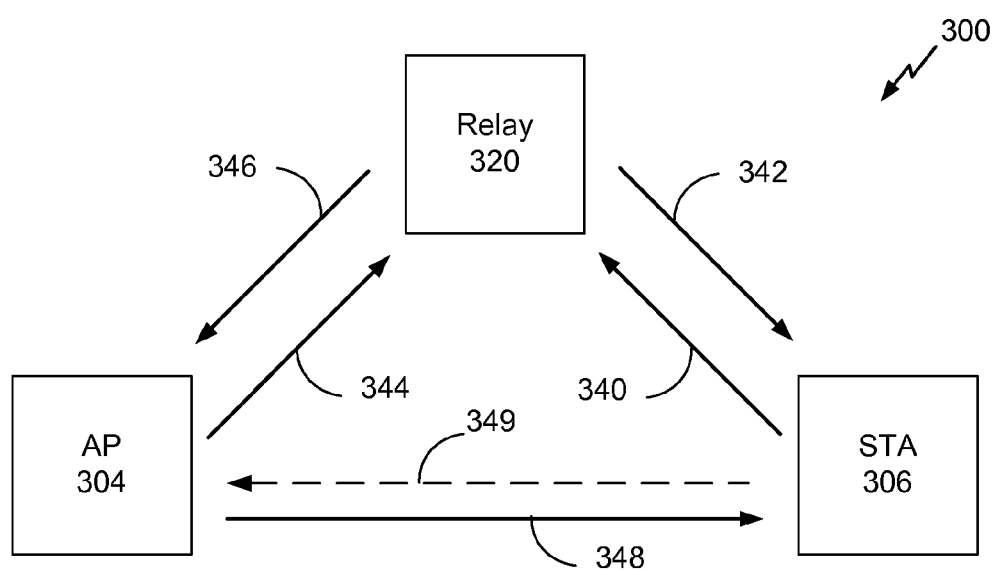
FIG. 3 illustrates an exemplary wireless communication system comprising an access point, a station, and a relay, in which aspects of the present disclosure may be employed.

FIG. 3 illustrates a wireless communication system 300 comprising an AP 304, a STA 306, and a relay 320. Note that while only one STA 306 and only one relay 320 are illustrated, the wireless communication system 300 may comprise any number of STAs and relays. In some embodiments, the AP 304 and the STA 306 can communicate with each other via the UL/DL transmissions 349/348. However, the AP 304 and the STA 306 may have a poor connection. For example, because the access point 304 may have a longer transmission range than the station, the station may be within the transmission range of the access point, while the access point is outside the transmission range of the station. In these embodiments, the AP 304 and the STA 306 may be able to communicate via the downlink (DL) connection 348 but may be only able to intermittently communicate via the uplink (UL) connection 349. In some embodiments, very little or no communication may be possible over uplink connection 349.

In certain aspects, if the AP 304 and the STA 306 have a poor connection and can communicate only intermittently or only via an DL transmission 348, a relay, such as the relay 320, may be set up to facilitate communication between the AP 304 and the STA 306.

Figure 4A:
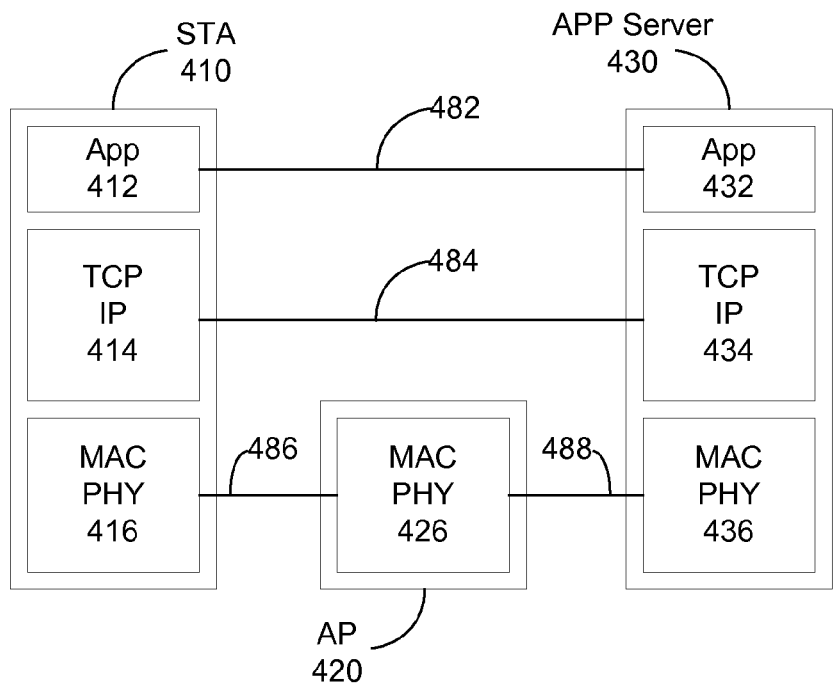
FIG. 4A illustrates the various communication layers in a typical wireless communication system.

FIG. 4A illustrates a subset of communication layers in a wireless communication system. In this embodiment, the STA 410 includes application layer 412, TCP/IP layers 414, and MAC/PHY layers 416. The application layer 412 may be associated with a software application, program, service, or process running on the STA 410. Functionally, the STA 410 connects to the AP 420, which includes MAC/PHY layers 426. The AP 420 provides a link between the STA 410 and the application server 430, which includes an application layer 432, TCP/IP layers 434, and MAC/PHY layers 436. The application server 430 may be a remote server having a software application, program, service, or process running that is associated with the application layer 432. Application communications 482 include communications between the processes associated with the application layer 412 on the STA 410 and the application layer 432 on the application server 430. Supporting application communications 482 are TCP/IP layers 414 and TCP/IP layers 434.

The TCP/IP layers may include any of the protocols in the TCP/IP suite, including, among others, TCP, IP, UDP, IGMP, ICMP, and IPSEC. TCP/IP communications 484 include as payload the communications between application layers 412 and 432. Lastly, supporting operation of the above layers are MAC/PHY layers 416, 426, and 436 on STA 410, AP 420, and application server 430, respectively. MAC/PHY communications 486 and 488 include as payload communications between TCP/IP layers 414 and 434. Those of skill in the art would understand that one or more additional communication links or devices including MAC/PHY layers (beyond AP 420) may be present in order to route communication between the application server 430 and the STA 410.

As stated, STA 410 may be a laptop computer, a PDA, a mobile phone, or other communication device. Such devices may consume unnecessary amounts of power consumption when the overhead signaling included in the TCP/IP communications 484 dominates useful data transmissions in application communications 482. Further, by limiting the amount of overhead signaling sent and received by STA 410, performance may be increased in the form of reduced wait times (e.g., page load delays). Overhead signaling may include TCP keep alive messaging, authentication, IP address assignment, multicast messaging used for ARP, Multicast DNS, DNS Service Discovery, and device discovery.

Figure 4B:
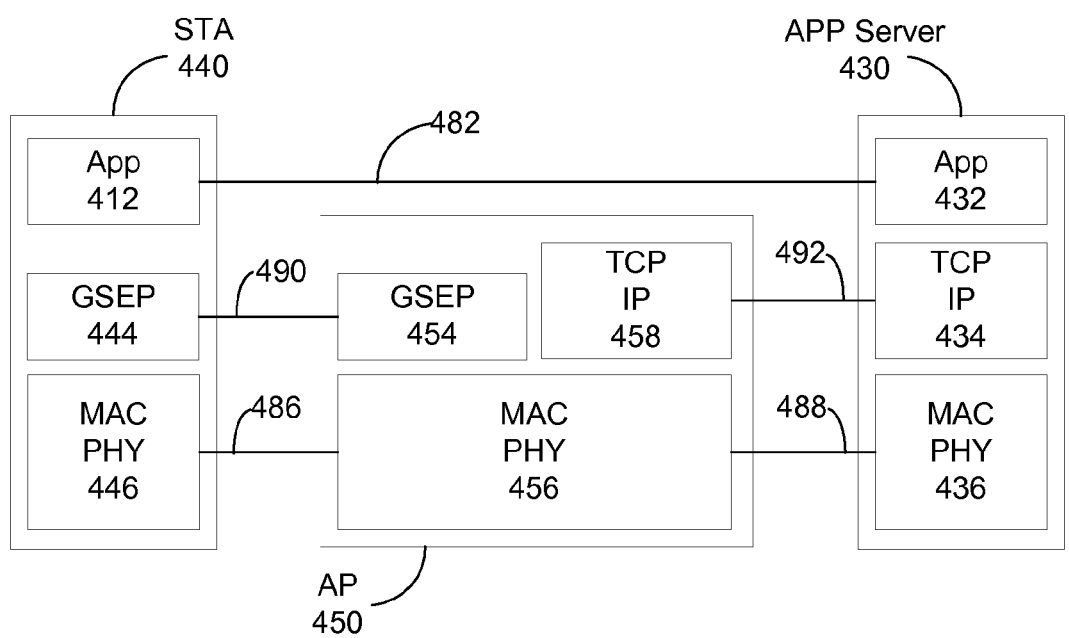
FIG. 4B illustrates the various communication layers in an exemplary embodiment of a wireless communication system with an access point proxy.

To reduce the number of overhead signaling transmissions at STA 410 and thereby reduce power consumption and increase performance, it may be desirable to move the TCP/IP layers to an AP such that the AP acts as a proxy for the STA, handling TCP/IP communication. FIG. 4B illustrates a subset of communication layers in an exemplary embodiment of a wireless communication system with an access point proxy. Like STA 410 in FIG. 4A, STA 440 includes application layer 412 and MAC/PHY layers 415. However, unlike STA 410, STA 440 includes generic socket encapsulation protocol (GSEP) layer 444 in place of TCP/IP layers 414. GSEP layer 444 may provide a TCP/IP-like interface to application layer 412, enabling application developers to use a generic socket API. GSEP layer 444 communicates with GSEP layer 454 on AP 450 via GSEP communications 490. GSEP layer 444 and GSEP layer 454 may be collectively referred to as GSEP peers. GSEP communications 490 may comprise messages including a header and a payload. With GSEP layer 454 interfacing with TCP/IP layers 458, TCP/IP communications 484 in FIG. 4A are offloaded from STA 440 to AP 450. In this TCP/IP proxy configuration, the TCP/IP communications 492 occur between the AP 450 and the application server 430, eliminating a portion of the signaling between STA 440 and AP 450. Thus, the AP 450 does not invoke, use, or rely upon TCP/IP to communicate with STA 440. As will be appreciated by one of skill in the art, multiple instances of GSEP layer 454 may be used to handle multiple TCP/IP sessions either from a single STA 440 or multiple stations. Further, multiple instances of GSEP layer 444 may be used to handle multiple applications on STA 440 requesting TCP/IP sessions.

Figure 4C:
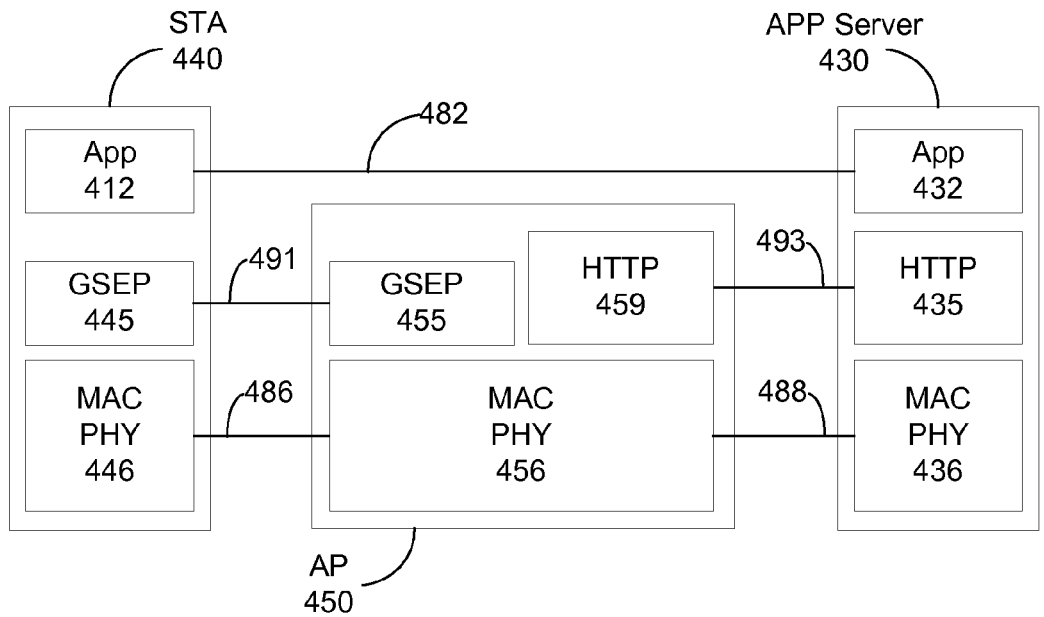
FIG. 4C illustrates the various communication layers in an exemplary embodiment of a wireless communication system with an access point proxy.

Note that besides TCP/IP communications, GSEP may offload other communications to the AP such that the AP acts as a proxy for those other communications, further reducing the number of overhead signaling transmissions, power consumption, and increasing performance. For example, FIG. 4C illustrates a subset of communication layers in an exemplary embodiment of a wireless communication system with an AP proxy that may offload HTTP communications.

Unlike in FIG. 4B, here the GSEP layer 445 provides an HTTP-like interface to application layer 412. GSEP layer 445 communicates with GSEP layer 455 on AP 450 via GSEP communications 491. Again, GSEP communications 491 may comprise messages including a header and a payload. With GSEP layer 455 interfacing with HTTP layer 458, HTTP communications are offloaded from STA 440 to AP 450. In this HTTP proxy configuration, the HTTP communications 493 occur between the AP 450 and the application server 430, eliminating a portion of the signaling between STA 440 and AP 450. Thus, the AP 450 does not invoke, use, or rely upon HTTP to communicate with STA 440. Of course, multiple instances of GSEP layer 445 and/or 444 of FIG. 4B may handle HTTP and/or TCP/IP. For example, one GSEP layer may handle TCP/IP communications for one application. Another GSEP layer on the same device may handle HTTP communications for another application. And yet another GSEP layer may handle some combination of HTTP and TCP/IP communications for yet another application. Examples of other communications GSEP may offload include: DHCP, DNS, FTP, IMAP, IRC, LDAP, MGCP, NNTP, BGP, NTP, POP, RPC, RTP, RTSP, RIP, SIP, SMTP, SNMP, SOCKS, SSH, Telnet, TLS/SSL, XMPP, TCP, UDP, DCCP, SCTP, RSVP, IP, ICMP, ECN, IGMP, IPsec, and others.

As stated, GSEP layer 444 provides a TCP/IP-like interface to application layer 412, enabling application developers to use a generic socket API. For example, application layer 412 may use a BSD socket to interface with GSEP layer 444. GSEP layer 444 may then convert the BSD socket calls into messages to be transmitted to GSEP layer 454. GSEP layer 454 may then interface with TCP/IP layers 458, providing application layer 412 with expected TCP/IP functionality (e.g., in-order delivery of packets, automatic re-requests, sequencing, etc.). In another aspect, application layer 412 may be aware of GSEP layer 444 providing a TCP/IP interface in place of TCP/IP layers 414. In yet another aspect, application layer 412 may interface with a GSEP API. In the case of an HTTP proxy, GSEP would provide an HTTP interface, receiving or intercepting HTTP function calls. For simplicity, TCP/IP will be used in the following descriptions, thought its use is intended as an example only.

Figure 5:
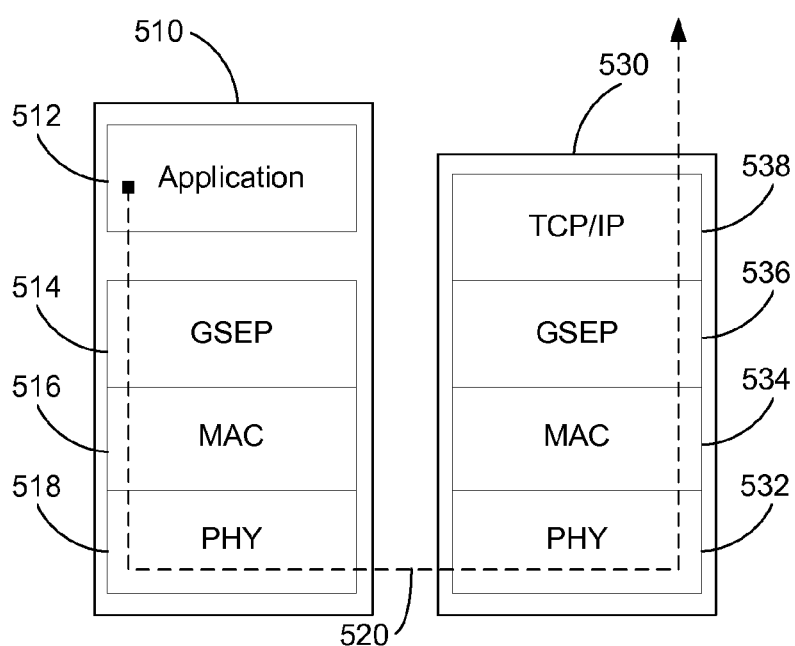
FIG. 5 illustrates the communication between layers in an exemplary embodiment of a wireless communication system with an access point proxy.

FIG. 5 illustrates communication between select layers in an exemplary embodiment of a wireless communication system with an AP TCP/IP proxy. As the request passes down the protocol stack on the STA 510 additional information relevant to that protocol layer is attached at each level. As the request passes up the protocol stack on the AP 530, the additional information relevant to that protocol layer is stripped at the respective level until a request originating at application 512 is presented at TCP/IP layers 538. For example, application 512 may produce a request 520 for data from an application server (not shown). The request 520 is received, captured, or intercepted at GSEP layer 514. GSEP layer 514 converts the received request into one or more GSEP messages. The message(s) are transmitted via MAC and PHY layers 516 and 518, which add respective protocol information, and pass through one or more communication links (not shown). Upon arrival at AP 510, PHY and MAC layers 532 and 534 strip the added protocol information and pass the message(s) to GSEP layer 536. GSEP layer 536 then converts the GSEP message into an appropriate TCP/IP request and submits, issues, or invokes the request to the TCP/IP layers 538, thus providing application 512 with TCP/IP functionality.

Figure 6:
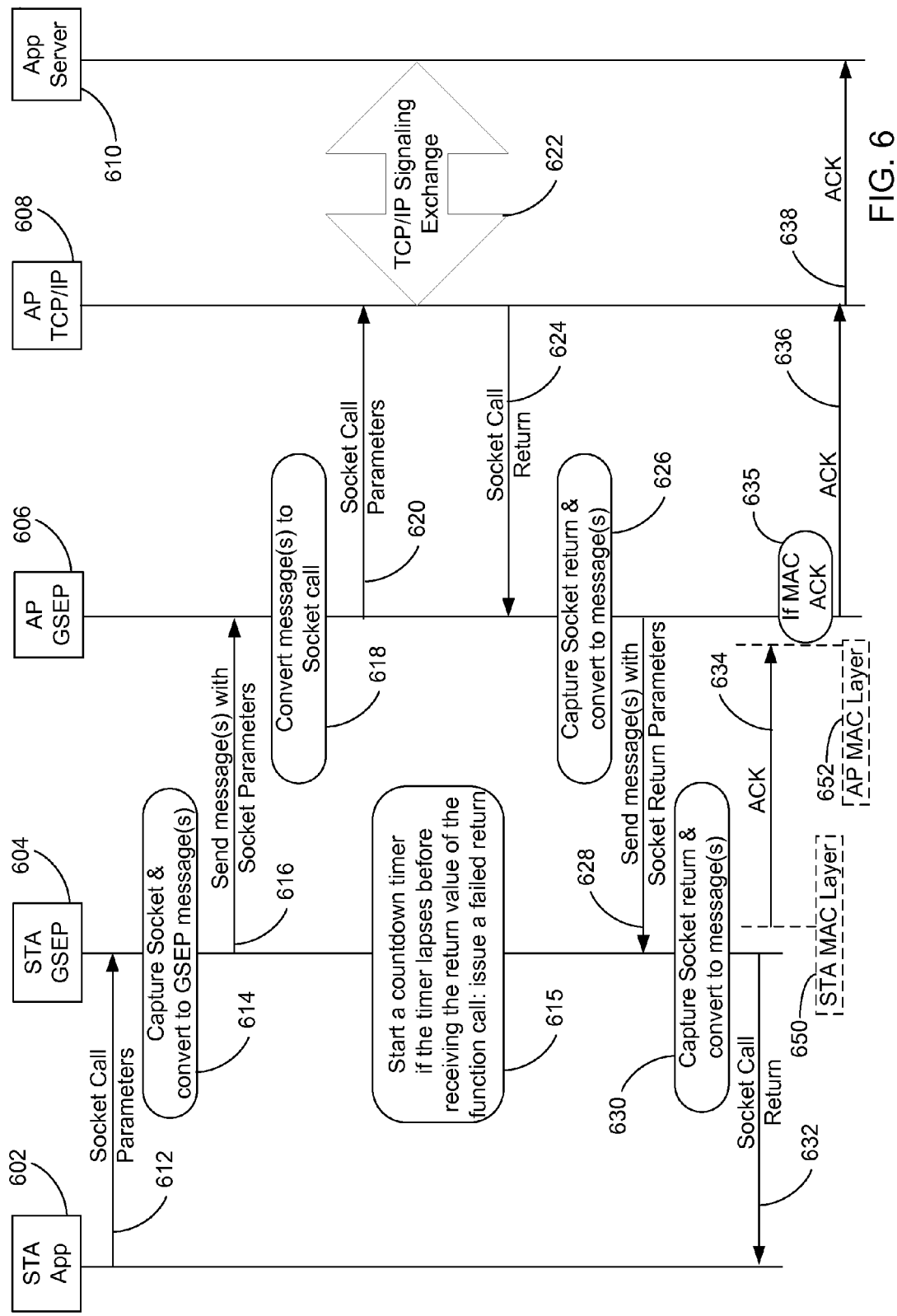
FIG. 6 is a signal flow diagram of communication between layers and devices in an exemplary embodiment of a wireless communication system with an access point proxy.

FIG. 6 is a signal flow diagram of communication between layers and devices in an exemplary embodiment of a wireless communication system with an AP TCP/IP proxy. At operation 612, a socket call, including any parameters, is issued from the STA application layer 602. At operation 614, the STA GSEP layer 604 captures the socket call and converts it into one or more GSEP messages. Next, at operation 616 the GSEP message(s) are transmitted to the AP GSEP layer 606 where, at operation 618, the GSEP message(s) are converted back to a socket call including the associated parameters, if any. At the AP TCP/IP layers 608, the socket call transmitted at operation 620 is received, and at operation 622 traditional TCP/IP communications commence between the AP TCP/IP layers 608 and the TCP/IP layers on application server 610. At operation 624, the AP GSEP layer 606 captures the socket call return from the AP TCP/IP layers 608 and at operation 626, the socket call return is converted into one or more GSEP messages. At operation 628, the AP GSEP layer 606 transmits the return GSEP message(s) to STA GSEP layer 604. At operation 630, the STA GSEP layer 604 converts the return GSEP message(s) to a socket call return which, at operation 632, is returned to STA application layer 602.

As discussed above, MAC/PHY layers support for higher layers in the protocol stack. Here, at operation 638, an ACK is transmitted from the AP TCP/IP layers to the application server 610. In this embodiment, the ACK at operation 638 may be based upon a MAC layer ACK 634 transmitted from the STA MAC layer 650 to the AP MAC layer 652, which indicates successful delivery of the GSEP message(s) at operation 628. At operation 635, the AP GSEP layer 606 checks whether the MAC layer ACK was received and, at operation 636, subsequently provides a return value to the AP TCP/IP layers 608 so that the ACK at operation 638 may be sent.

Embodiments of GSEP disclosed herein may initiate a timer for messages sent from either the AP GSEP layer or the STA GSEP layer. Should the timer exceed or reach a timeout period, the GSEP layer may issue a fail return value to the source of the function call that initiated the message. For example, at operation 615, the STA GSEP layer 604 may begin a countdown timer. Should the countdown timer lapse without receiving a return for the message transmitted at operation 616, a socket call return may be transmitted up to the STA application layer 602 indicating failure.

Figure 7:
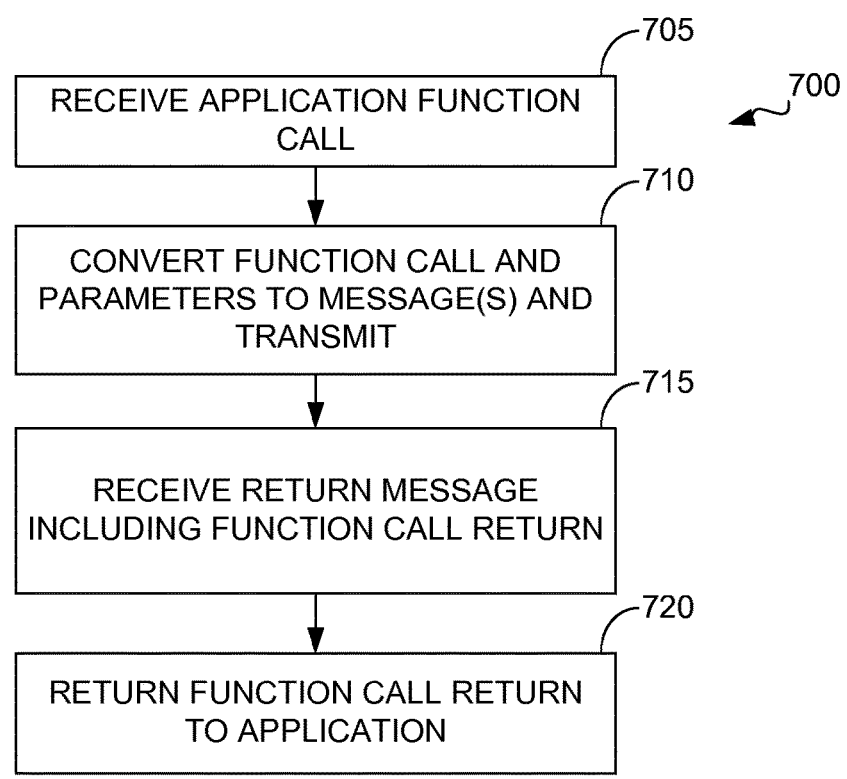
FIG. 7 is a flowchart of operations of an exemplary embodiment of the generic socket encapsulation protocol layer on a station, in accordance with exemplary embodiments of the invention.

FIG. 7 is a flowchart of operations of an exemplary embodiment of the GSEP layer on a STA, in accordance with an exemplary embodiment of the AP proxy. At block 705, the GSEP layer captures an application socket API function call. Next, at block 710, the function call (including any parameters) is converted into one or more GSEP messages which are then transmitted to an AP GSEP layer (not shown). The STA GSEP layer subsequently waits, at block 715, until it receives one or more return messages from the GSEP layer on an AP and, at block 720, converts the message(s) into a socket function call return and returns the function call return to the application.

In another embodiment, a device that may be employed within a wireless communication system includes: means for receiving a network function call from an application; converting the received network function call to a message, the message including information for issuing the network function call by a recipient of the message; and returning a network function call return to the application. The device further includes means for transmitting the message and means for receiving a return message, the return message including the network function call return. The means for receiving, converting, and returning may include a processor, such as processor 204 in FIG. 2, or DSP, such as DSP 220 in FIG. 2. The means for receiving, converting, and returning may also include one or more of a processor, signal generator, transceiver, decoder, or a combination of hardware and/or software component(s), circuits, and/or module (s). The means for transmitting may include transmitter, such as transmitter 210 in FIG. 2. The means for transmitting may also include one or more of a processor, signal generator, transceiver, decoder, or a combination of hardware and/or software component(s), circuits, and/or module(s). The means for receiving may include receiver, such as receiver 212 in FIG. 2. The means for receiving may also include one or more of a processor, signal generator, transceiver, decoder, or a combination of hardware and/or software component(s), circuits, and/or module(s).

Figure 8:
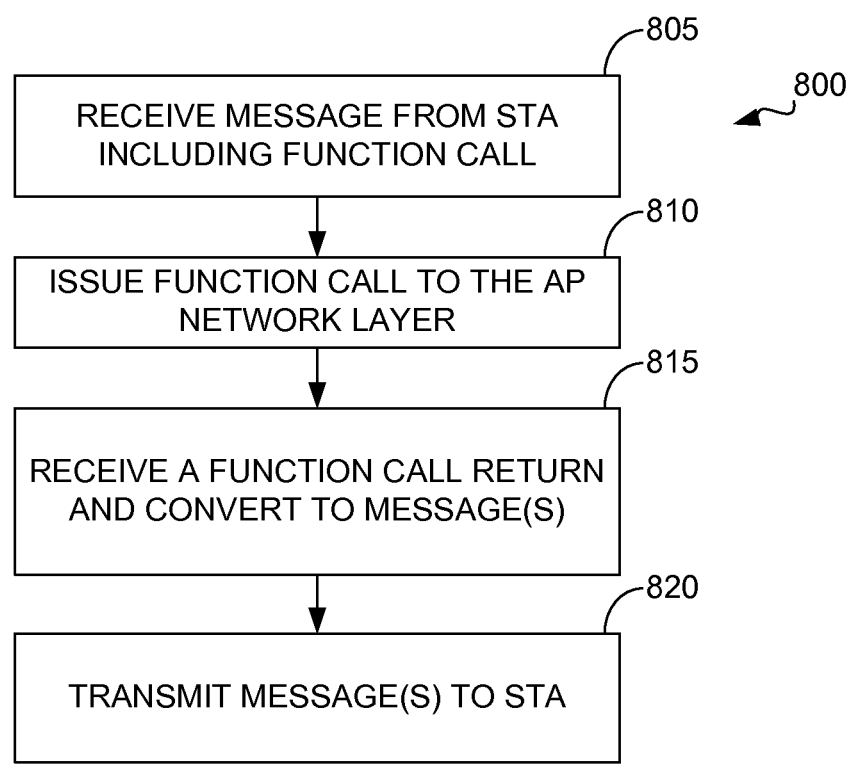
FIG. 8 is a flowchart of operations of an exemplary embodiment of the generic socket encapsulation protocol layer on an access point, in accordance with exemplary embodiments of the invention.

FIG. 8 is a flowchart of operations of an exemplary embodiment of the GSEP layer on an AP, in accordance with an exemplary embodiment of the AP proxy. At block 805, the GSEP layer receives a GSEP message from a GSEP layer on a STA and converts the message into a socket API function call. Next, at block 810, the AP GSEP layer issues the function call to the AP TCP/IP layers. At block 815, once AP TCP/IP communications have resulted in a return value, the GSEP layer converts the return value into one or more GSEP messages and, at block 820, transmits the message(s) to the STA GSEP layer.

In another embodiment, a device that may be employed within a wireless communication system includes: means for receiving a message including a network function call; means for issuing the network function call to a network layer and receiving a network function call return from the network layer; and means for transmitting another message including the network function call return. The means for receiving may include receiver, such as receiver 212 in FIG. 2. The means for receiving may also include one or more of a processor, signal generator, transceiver, decoder, or a combination of hardware and/or software component(s), circuits, and/or module(s). The means for issuing and receiving may include a processor, such as processor 204 in FIG. 2, or DSP, such as DSP 220 in FIG. 2. The means for issuing and receiving may also include one or more of a processor, signal generator, transceiver, decoder, or a combination of hardware and/or software component(s), circuits, and/or module(s). The means for transmitting may include transmitter, such as transmitter 210 in FIG. 2. The means for transmitting may also include one or more of a processor, signal generator, transceiver, decoder, or a combination of hardware and/or software component(s), circuits, and/or module(s).

Figure 9A:
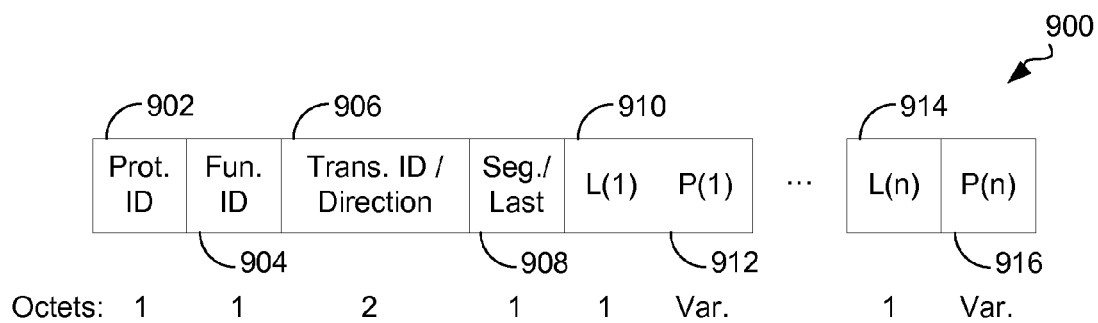
FIGS. 9A-9C depict exemplary message formats and field definitions for an embodiment of the generic socket encapsulation protocol.
Figure 9B:
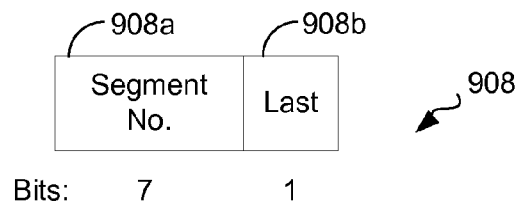
Figure 9C:
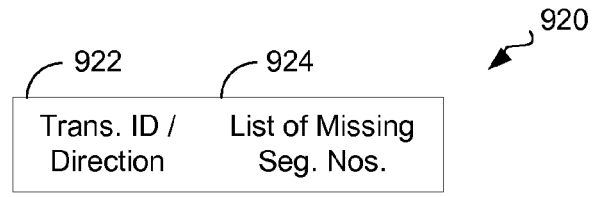

FIGS. 9A-9C depict exemplary message formats for an embodiment of GSEP. In FIG. 9A, the GSEP message 900 includes a protocol identifier 902, a function identifier 904, a transaction identifier/direction identifier 906, a segment number/last segment indicator 908, and a variable number of variables (912, 916), each variable preceded by a length variable (910, 914). The protocol identifier 902 may indicate which TCP/IP transport protocol communication is contained within the message (e.g., TCP, UDP, etc.). The function identifier 904 may indicate which function of the particular TCP/IP protocol communication is contained within the message (e.g., read, write, etc.). The transaction identifier/direction identifier 906 may include a unique identifier for a particular instance of a function call, and whether the message is a function call or a function return. Payload data P(1)-P(n), 912, 916 of variable length, include the encapsulated payload for the particular GSEP message. The length of variables 912, 916 is contained within length variables 910, 914. Note that any encryption applied above the TCP/IP layers (e.g., at STA application layer 602 or above AP TCP/IP layers 608) is reflected within the payload data P(1)-P(n) and thus not affected by GSEP.

In another embodiment, GSEP may perform segmentation to reduce message size or to split up a large data payload. For example, a read or send function may attempt to transmit a large file. GSEP segmentation allows a single function call to be sent via multiple MAC service data units. An example of segmentation is presented below in the description of FIG. 11. Here, FIG. 9B depicts a more detailed view of the segment number/last segment indicator 908 contained within GSEP message 900. Segment number/last segment indicator 908 includes a 7-bit field indicating the segment number 908a, and a 1-bit field indicating the last segment 908b. Thus, in this embodiment, a function call can be divided into a maximum of 128 segments.

To provide reliable transport of function calls between GSEP peers with segmentation enabled, it may be desirable to include a NAK scheme to enable missing segments to be retransmitted without having to retransmit all of the segments. For example, GSEP may implement a NAK scheme if a MAC layer ACK (e.g., FIG. 6 operation 634) is unavailable at the GSEP layer. With reference to FIG. 9C, a GSEP message may include a NAK response 920. A NAK response 920 may comprise a transaction identifier/direction identifier 922 and a list of missing segment numbers 924 (e.g., a list of the 7-bit segment number fields 908a not received by the GSEP layer). The transaction identifier/direction identifier 922 may correspond with the transaction identifier/direction identifier 906 in an incomplete message. In an embodiment of a NAK scheme where a function call is segmented, the last segment 908b may be set to a '1' for all segments except the last segment. Any intermediary segments not received by the receiving GSEP layer may be indicated with a NAK response 920. Should delivery of the last segment fail, the sending GSEP may rely on the timeout period discussed above. Alternatively, where a function call is not segmented or includes only one segment, the segment number 908a and last segment 908b may be set to all '0's. In this instance, the sending GSEP layer may rely on the timeout period discussed above.

Figure 10:
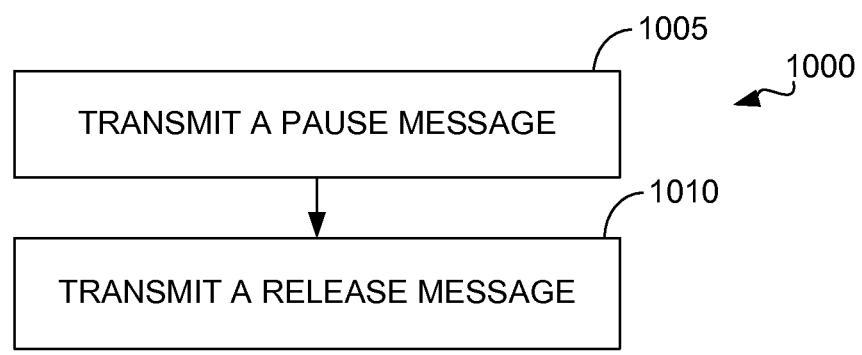
FIG. 10 is a flowchart of one embodiment of a flow control operation at a generic socket encapsulation protocol (GSEP) layer.

In another embodiment, GSEP peers may implement flow control. Flow control may be desirable where a single AP is acting as a TCP/IP proxy for multiple STAs and/or multiple applications. It may also be desirable where a STA is unable to process data received from the AP proxy in a timely manner. In any case, flow control may avoid buffer overflow at either the STA or AP. Flow control may be implemented with a pause message transmitted from a receiving GSEP layer to a sending GSEP layer. FIG. 10 is a flowchart of one embodiment of flow control operation at a GSEP layer. Where the GSEP layer detects a buffer overflow has occurred or may occur, at block 1005, the receiving GSEP layer transmits a pause message to the sending GSEP layer. The pause message may include a transaction identifier and an indication of the last segment received. Upon receipt of the pause message, the sending GSEP layer may store an indication of the last segment received to determine the first segment to transmit once transmissions resume. The pause message may further include a time delay until which transmissions may resume. A time delay included in the pause message renders block 1010 optional as the GSEP layer receiving the pause message will automatically resume transmissions after the timeout period. However, where no time delay is specified, the receiving GSEP layer may further transmit a release message, the release message including a transaction identifier notifying the sending GSEP layer transmissions may resume. Further, the receiving GSEP layer may transmit a release message even if a time delay was included in the original pause message should the receiving GSEP layer seek to resume transmissions sooner. Prior to receiving a pause message, some GSEP messages may have been sent to and stored by a MAC layer buffer in a queue to be sent. To prevent these queued GSEP messages from being sent to the receiving GSEP layer, the sending GSEP layer may notify the local MAC layer to flush its transmit buffer.

Figure 11:
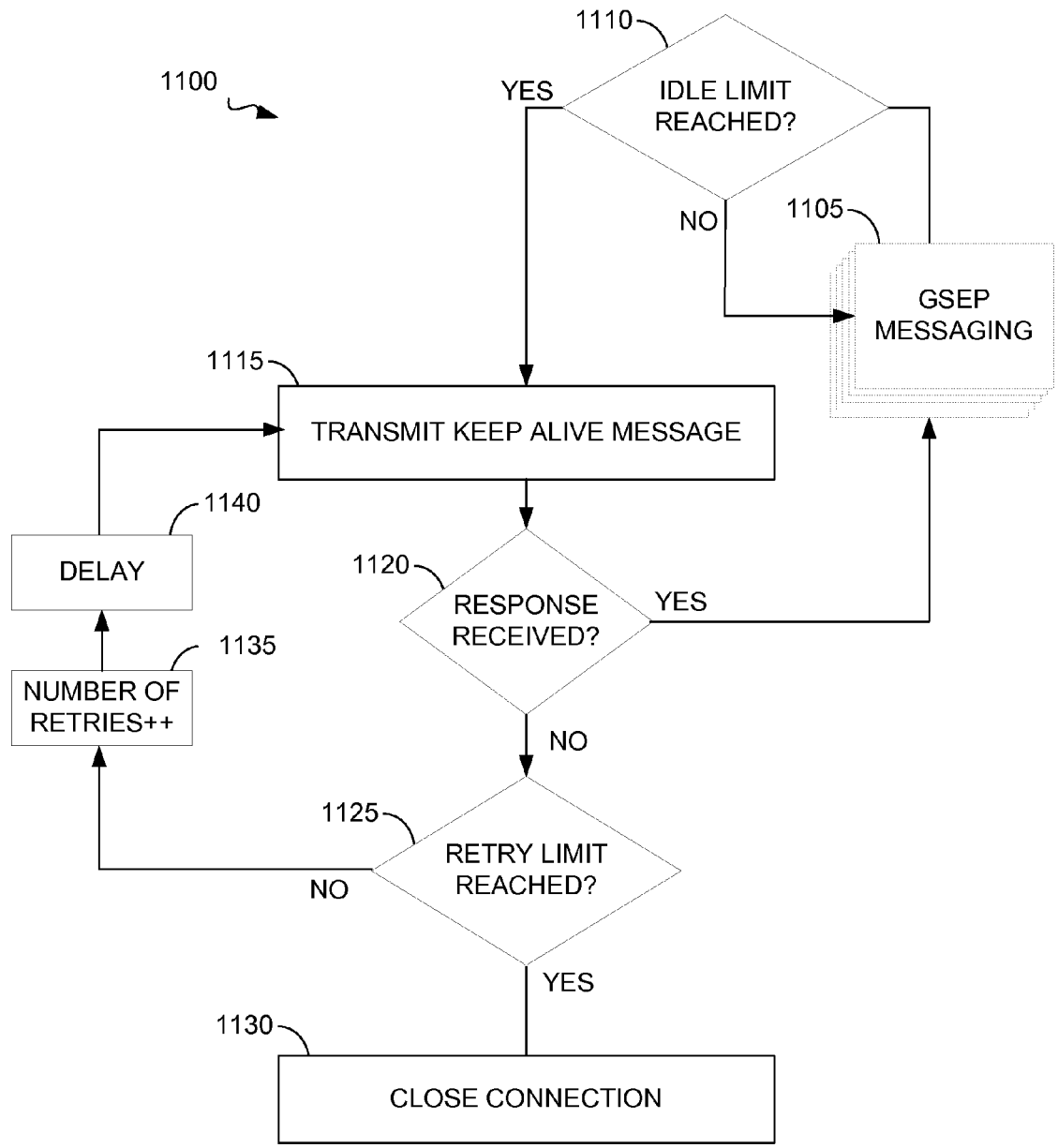
FIG. 11 is a flowchart of one embodiment of a keep alive operation at an AP generic socket encapsulation protocol (GSEP) layer.

In another embodiment, the AP GSEP layer may implement keep alive. Keep alive involves the AP GSEP layer transmitting a keep alive message to the STA GSEP layer and the STA GSEP layer transmitting a corresponding response. With reference to FIG. 4B, should AP 450 lose MAC/PHY communications 486 with STA 440, unreliable TCP/IP protocol communication operation may result. Thus, keep alive improves the reliability of TCP/IP communications. FIG. 11 is a flowchart of one embodiment of keep alive operation at the AP GSEP layer. At block 1105, GSEP peers may be communicating normally. At block 1110, if the AP GSEP layer detects communication has been idle for a period of time exceeding a threshold, at block 1120 the AP GSEP layer transmits a keep alive message. At block 1120, the AP GSEP layer checks whether a response to the keep alive message was received from the STA GSEP layer. If a response to was received, GSEP messaging 1105 may continue. If no response was received, at block 1125 the AP GSEP layer may determine whether the number of keep alive retry attempts has exceeded a threshold. If the retry threshold has been reached, at block 1130 the AP GSEP layer may close the TCP/IP connection. If the retry threshold has not been reached, at block 1135 the AP GSEP layer may increment a counter indicating the number of keep alive messages sent. At block 1140, the AP GSEP layer may delay for a period of time transmitting another keep alive message at block 1115.

Figure 12:
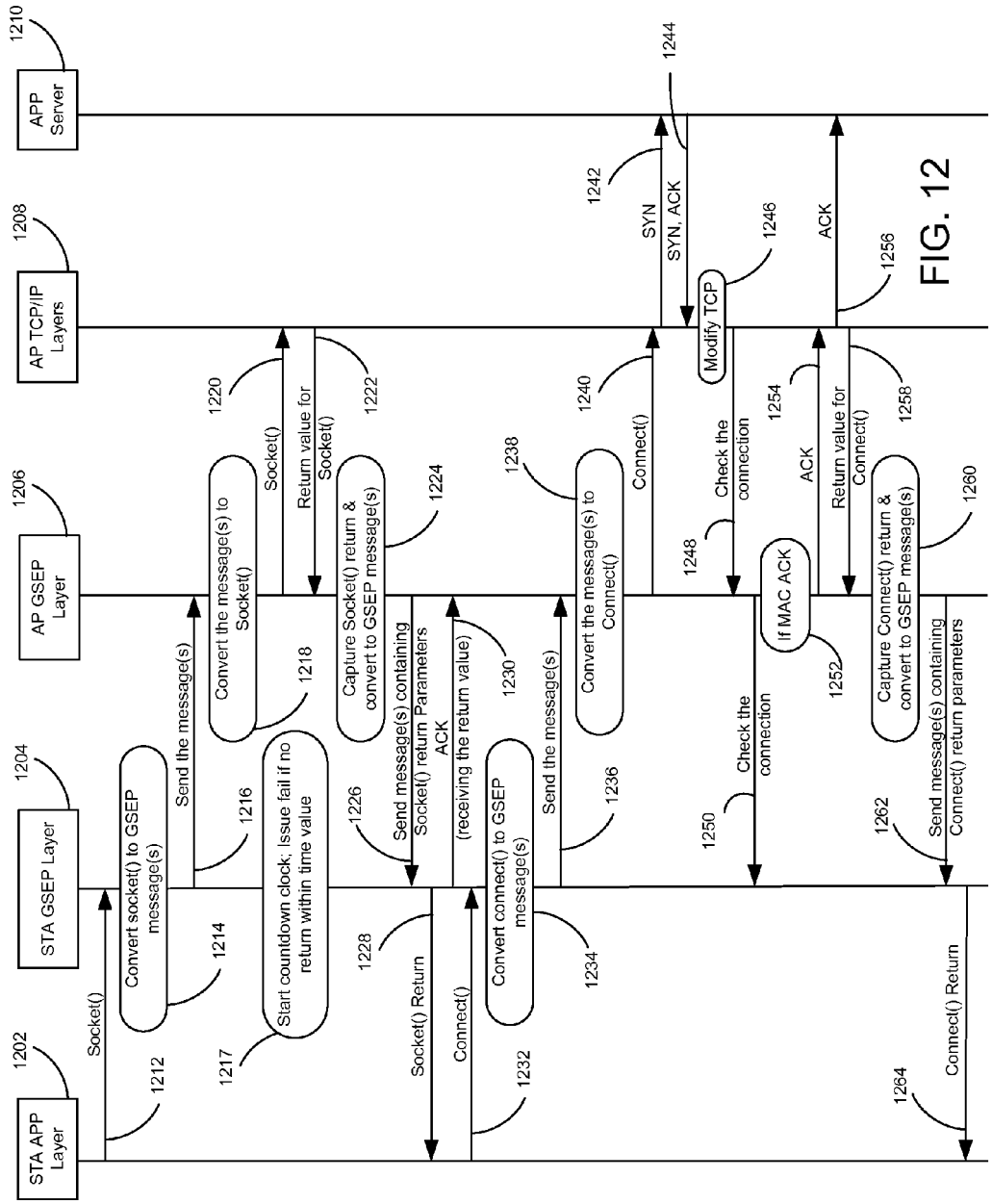
FIG. 12 is a signal flow diagram of one way of establishing a TCP/IP connection in an exemplary embodiment of a wireless communication system with an access point proxy.

FIG. 12 is a signal flow diagram of one way of establishing a TCP/IP connection in an exemplary embodiment of a wireless communication system with an access point proxy. At operation 1212, STA application layer 1202 issues a socket function call. At operation 1214, STA GSEP layer 1204 receives, intercepts, or captures the socket function call and converts the function call into one or more GSEP messages. At operation 1216, the STA GSEP layer 1204 sends the message(s) including the socket function call to the AP GSEP layer 1206. At operation 1218, upon receipt and conversion of the received message(s), the AP GSEP layer 1206 issues the socket function call to the AP TCP/IP layers 1208 at operation 1220. At operation 1222, the TCP/IP layers 1208 opens a socket and returns a socket return. At operation 1224, the AP GSEP layer receives, intercepts, or captures the socket return and converts it into one or more GSEP messages. At operation 1226, the AP GSEP layer 1206 sends the message(s) including the socket return to the STA GSEP layer 1204. At operation 1228, the STA GSEP layer 1204 converts the message(s) to a socket return and returns it to the STA application layer 1202. At operation 1230 the STA transmits an ACK to the AP. The ACK may originate from the STA GSEP layer 1204 or from the STA MAC layer (not shown).

Upon receipt of the socket return, at operation 1232 the STA application layer 1202 issues a connect function call. At operation 1234, STA GSEP layer 1204 receives, intercepts, or captures the connect function call and converts the function call into one or more GSEP messages. At operation 1236, the STA GSEP layer 1204 sends the message(s) including the connect function call to the AP GSEP layer 1206. At operation 1238, the AP GSEP layer 1206 uses the information contained within the message(s) to reconstruct the connect function call, which it issues to the AP TCP/IP layers 1208 at operation 1240. At operation 1242, the AP TCP/IP layers 1208 sends a synchronize packet to the application server 1210. Upon receipt of the synchronization packet, at operation 1244 the application server 1210 sends a synchronize-acknowledgment packet. At operation 1246, the AP TCP/IP layers may be modified based on data received from the application server 1210.

To respond to the synchronize-acknowledgment, the connection is checked at operations 1248 and 1250 via the AP GSEP layer 1206 intercepting the ACK request and passing it to the STA GSEP layer 1204. Relying on the MAC layer ACK from the STA, at operation 1254, the AP GSEP layer returns an ACK to the AP TCP/IP layers 1208. Then, at operation 1256, the AP TCP/IP layers 1208 transmits an ACK to the application server 1210 and the TCP/IP connection between the AP TCP/IP layers 1208 and the application server 1210 is established. At operation 1258, the AP TCP/IP layers returns a connect return. At operation 1260, the AP GSEP layer 1206 receives, intercepts, or captures the connect return and converts it into one or more GSEP messages. At operation 1262, the AP GSEP layer 1206 sends the message(s) including the connect return to the STA GSEP layer 1204. Finally, at operation 1264, the STA GSEP layer 1204 converts the message(s) to a connect return and returns it to the STA application layer 1202.

At operation 1217, a timer was started for the socket function call return response. If the timeout period was exceeded, the STA GSEP layer 1204 may return a return value indicating a failure to the STA application layer 1202. Of course, timers may be initiated for other GSEP transmissions, including the connect function call at operation 1234.

Figure 13:
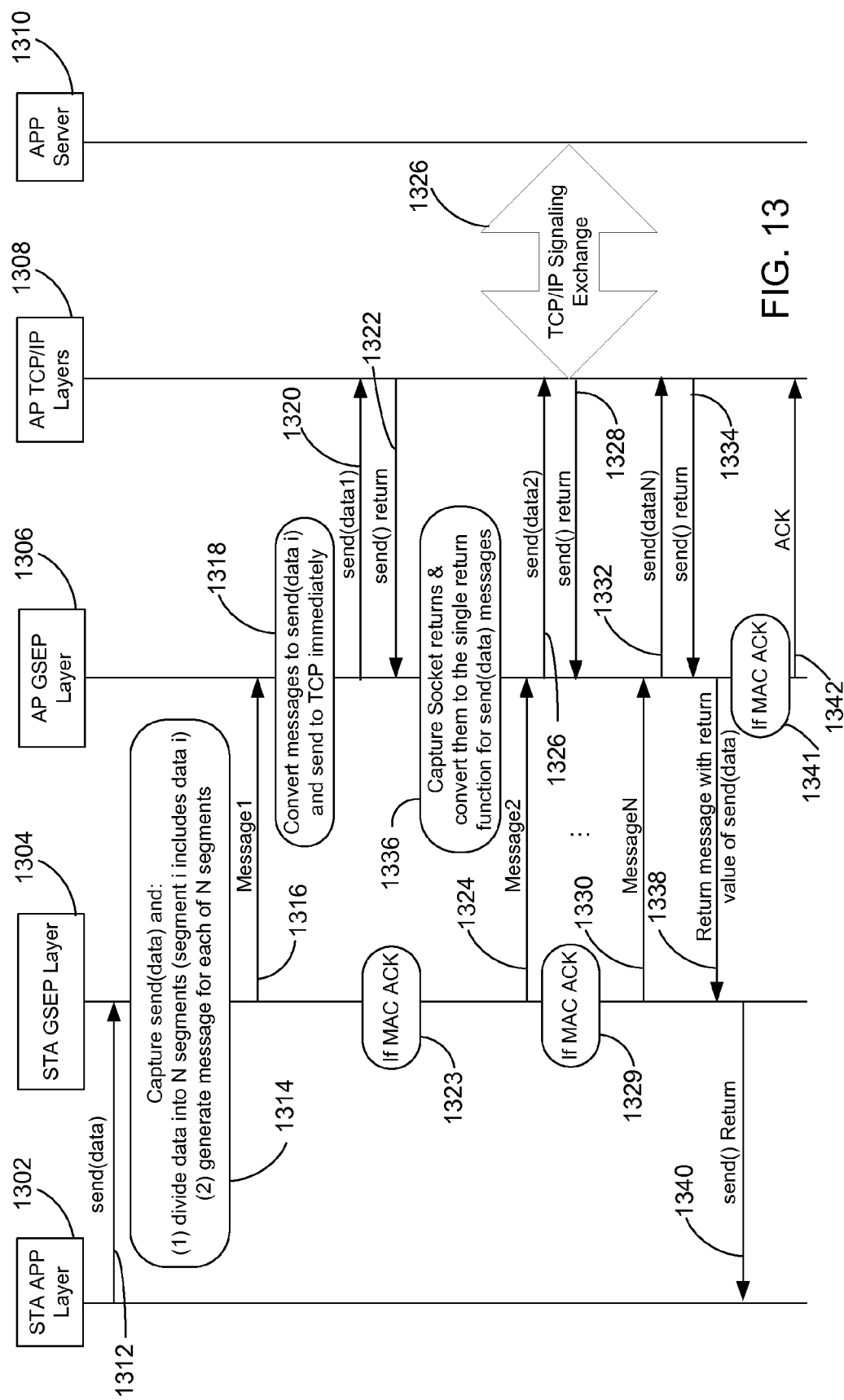
FIG. 13 is a signal flow diagram of an exemplary send, or write, operation including segmentation in an exemplary embodiment of a wireless communication system with an access point proxy.

FIG. 13 is a signal flow diagram of an exemplary send, or write, operation including segmentation in an exemplary embodiment of a wireless communication system with an access point proxy. At operation 1312, STA application 1302 issues a send (or write) function call with the desired data to be sent as a parameter. At operation 1314, STA GSEP layer 1304 receives, intercepts, or captures the socket function call and converts the function call into N GSEP messages, each including a portion of the sent data. GSEP messages transmitted from the STA GSEP layer 1304 to the AP GSEP layer 1306 thus may include the segment number/last segment indicator 908, discussed above with reference to FIG. 9. At operation 1316, the STA GSEP layer 1304 sends the one of the N messages to the AP GSEP layer 1306. At operation 1318, upon receipt and conversion of the message, the AP GSEP layer 1306 immediately issues a send function call including the data received in the GSEP message to the AP TCP/IP layers 1308. At operation 1322, the AP TCP/IP layers 1308 transmits a send return to the AP GSEP layer. At operation 1323, the STA GSEP layer 1304 checks whether a MAC layer ACK was received for the first transmitted message, and if so, proceeds to send the next of the N messages to the AP GSEP layer 1306. This process continues for each of the N messages (operations 1324, 1326, 1328, 1329, 1330, 1332, 1334). Note the Nth message may have the last segment 908b bit set. In this embodiment, the STA GSEP layer 1304 was relying on MAC layer ACKs (e.g., operations 1323, 1329) to verify delivery of the data. Meanwhile at operation 1336, the AP GSEP layer 1306 was capturing the send returns for conversion into a single send return. Having received the last segment indicator in the Nth message, at operation 1338 the AP GSEP layer 1306 transmits a send return with the corresponding return value to the STA GSEP layer 1304. The STA GSEP layer 1304 transmits the send return to the STA application layer 1302. At operation 1341, the AP GSEP layer 1306 relies on the MAC layer ACK to transmit an ACK to an upstream device. Note the send function calls to the AP TCP/IP layers (e.g., operations 1320, 1326, 1332) initiate TCP/IP communications with the application server 1310, as indicated by communications 1326.

Figure 14:
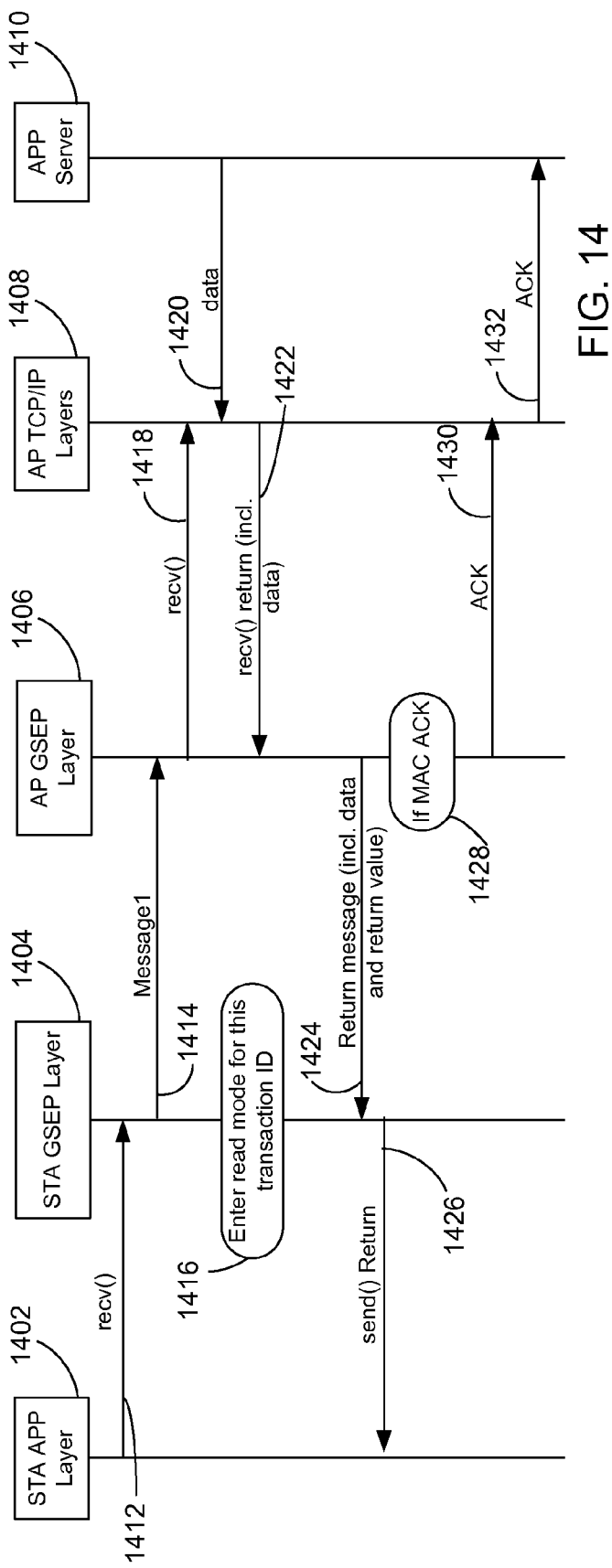
FIG. 14 is a signal flow diagram of an exemplary receive, or read, operation not including segmentation in an exemplary embodiment of a wireless communication system with an access point proxy.

FIG. 14 is a signal flow diagram of an exemplary receive, or read, operation not including segmentation in an exemplary embodiment of a wireless communication system with an access point proxy. At operation 1412, STA application 1402 issues a receive (or read) function call. The STA GSEP layer 1404 receives, intercepts, or captures the receive function call and converts the function call one or more GSEP messages which, at operation 1414, are transmit to the AP GSEP layer 1406. At operation 1418, upon receipt and conversion of the message, the AP GSEP layer 1406 issues the receive function call to the AP TCP/IP layers 1408. At operation 1420, the application server 1410 transmits data to the AP, perhaps due to a previous communication. At operation 1422, the AP TCP/IP layers 1408 transmits a receive return which includes the data received from the application server 1410. As indicated by operation 1416, the STA GSEP layer 1404 may have entered a read mode to receive data based upon the earlier interception. At operation 1424, after converting the receive return into one or more GSEP message(s), the AP GSEP layer transmits the message (s) to the STA GSEP layer 1404. At operations 1428 and 1430, the AP GSEP layer 1406 transmits an ACK to the AP TCP/IP layers 1408, relying on a MAC layer ACK. This allows the AP TCP/IP layers 1408 at operation 1432 to transmit an ACK to the application server 1410. Meanwhile at operation 1402, upon receipt and conversion of the message(s), the STA GSEP layer 1404 transmits the send return to the STA application layer 1402.

Figure 15:
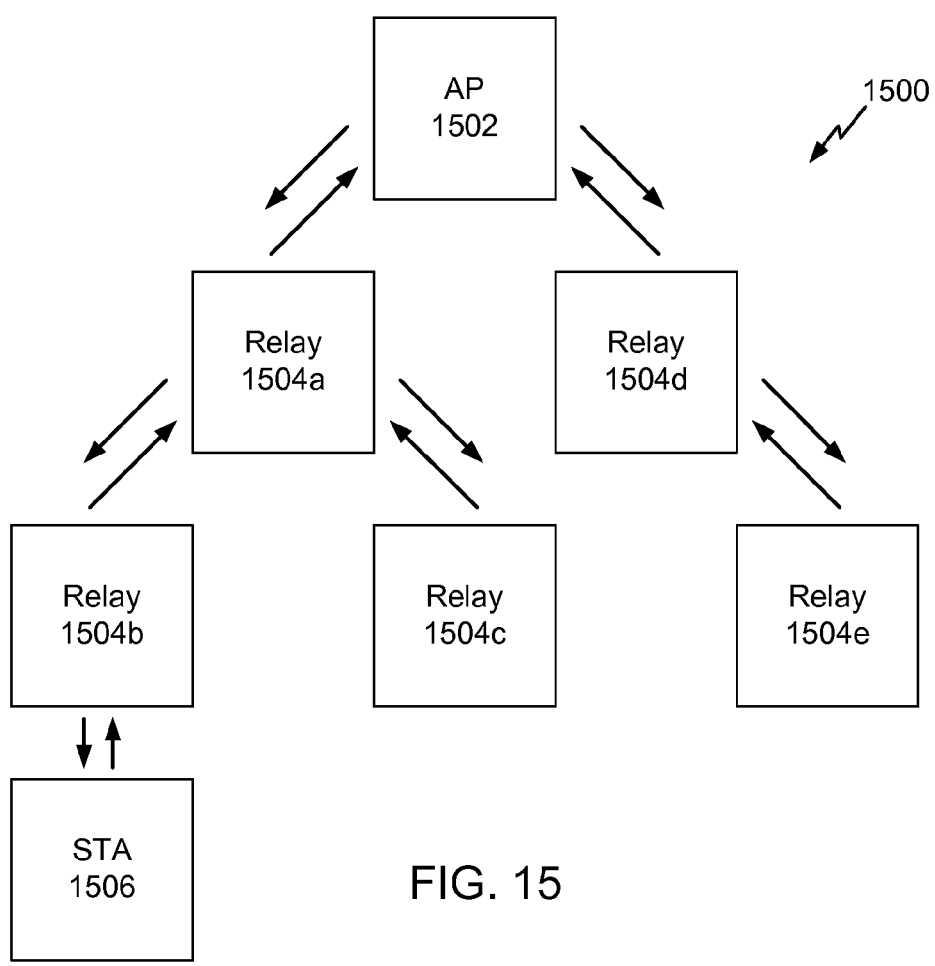
FIG. 15 illustrates an exemplary multi-hop wireless communication system comprising an access point, a station, and a plurality of relays.

FIG. 15 illustrates an exemplary multi-hop wireless communication system comprising an AP, a STA, and a plurality of relays. STA 1506 and AP 1502 may, for reasons discussed above, be unable to communicate directly and instead route UL/DL transmissions through one or more relays. In this example, UL/DL transmissions are routed between STA 1506 and AP 1502 via relays 1504a and 1504b. As discussed in the description of FIG. 6, in one embodiment of the present invention an AP TCP/IP proxy relies on a MAC layer ACK in order to transmit an ACK to an upstream device (e.g., application server, router, or other communication link). However, because MAC layer acknowledgments may not be available above the MAC layer, a MAC layer ACK received at a remote communication link may be undetectable. Returning to FIG. 15, the AP 1502 may receive a MAC layer ACK from relay 1504a. However, a MAC layer ACK which was transmit from either relay 1504b or STA 1506 may terminate at the next hop, and thus go undetected by the AP 1502. As a result, an AP TCP/IP proxy would be unable to transmit an ACK to an upstream device with certainty the STA 1506 received the data.

Figure 16A:
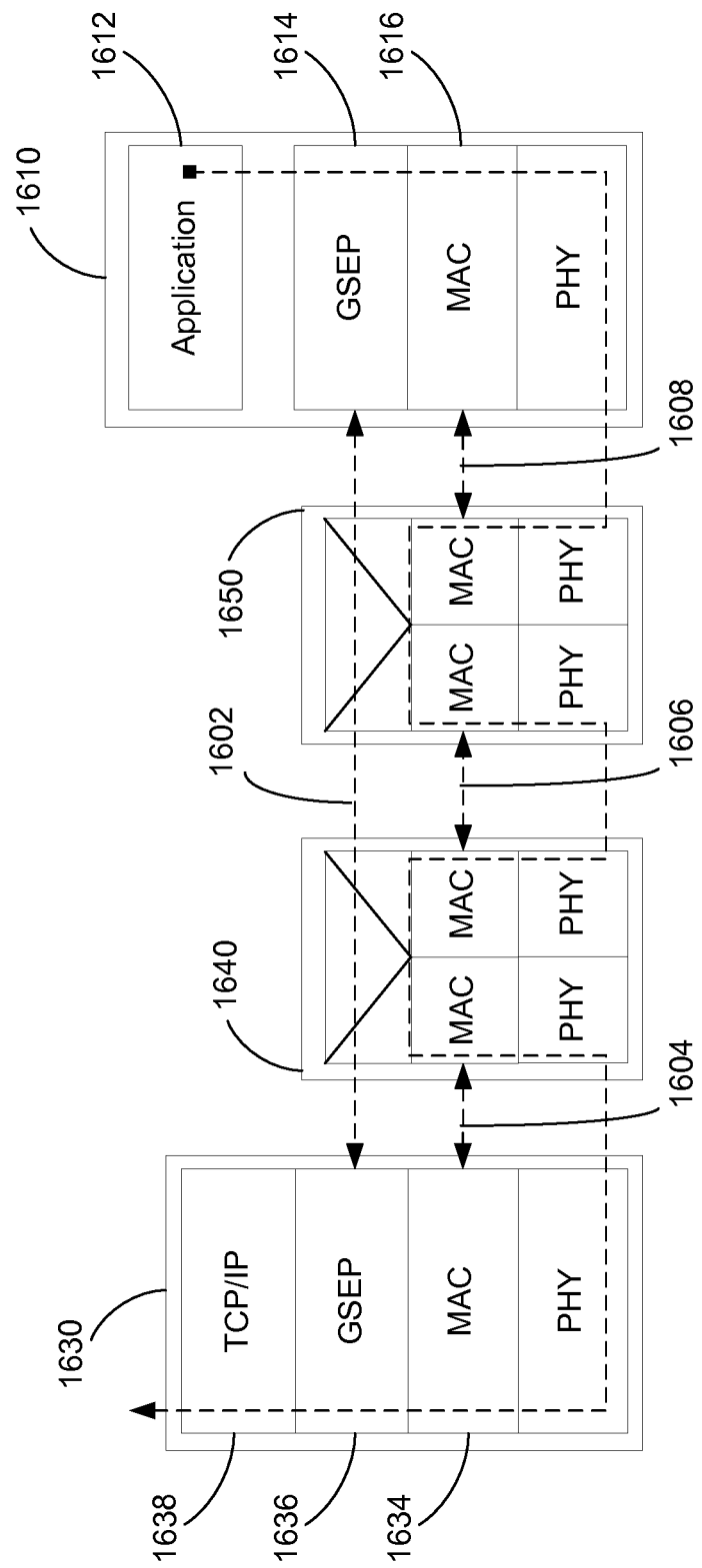
FIG. 16A depicts an exemplary GSEP sequencing and acknowledging technique for GSEP messages in a multi-hop wireless communication system with an AP TCP/IP proxy.

FIG. 16A depicts an exemplary GSEP sequencing and acknowledging technique for GSEP messages in a multi-hop wireless communication system with an AP TCP/IP proxy. As described above, in the context of a multi-hop wireless communication system, the MAC layer ACK may be insufficient to indicate whether a GSEP layer message transmitted between an AP and STA was received. For example and with reference to FIG. 16A, acknowledgments at MAC layer communications 1606 and 1608 may be unobservable at AP 1630. Thus, in this embodiment, end-to-end link level sequencing and acknowledging is implemented between AP GSEP layer 1636 and STA GSEP layer 1614 via GSEP layer communications 1602. When a return (e.g., return 628 in FIG. 6) is transmitted via GSEP message(s) from AP GSEP layer 1636 to STA GSEP layer 1614, the message includes a sequencing identifier. Upon receipt of a message with a sequencing identifier, STA GSEP layer 1614 transmits a message back to AP GSEP layer 1636 including an acknowledgment of receipt (e.g., identifying the sequencing identifier, identifying the next expected sequencing identifier, identifying an amount of data received). As a result, AP TCP/IP layers 1638 can transmit an ACK to an application server (not shown) based on receipt of the message including the acknowledgment from the STA GSEP layer 1614. In another embodiment, the MAC layer acknowledgment may be modified to include an end-to-end packet sequencing and acknowledgment.

With this embodiment, MAC layer communications 1604, 1606, and 1608 may be retransmitted as necessary relying on MAC level ACKs, sometimes multiple times. AP GSEP layer 1636 may further include a timeout period. If a GSEP message including an acknowledgment is not received prior to the timeout period lapsing, the AP GSEP layer 1636 may retransmit the unacknowledged message including the sequencing identifier. In addition, because the relays in a multi-hop wireless communication system are likely awake at the same time, the relays 1640 and 1650 may not need any additional buffer space for GSEP messages beyond a MAC layer buffer.

Figure 16B:
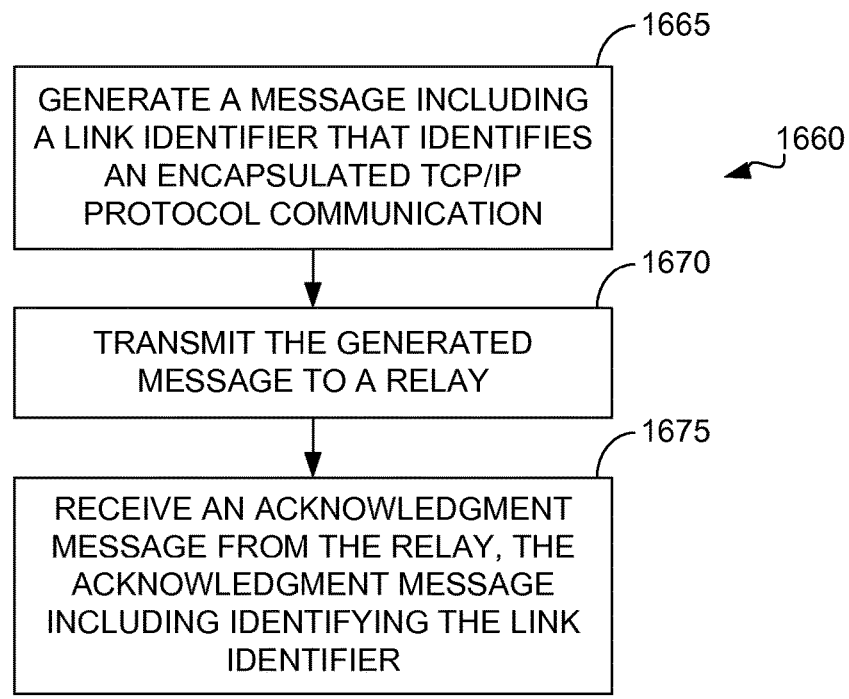
FIG. 16B is a flowchart of an exemplary method of sequencing and acknowledging GSEP messages in a multi-hop wireless communication system with an AP TCP/IP proxy.

FIG. 16B is a flowchart of an exemplary method 1660 of sequencing and acknowledging GSEP messages in a multi-hop wireless communication system with an AP TCP/IP proxy. In this embodiment, method 1660 may be executed by a processor residing in an AP. In block 1665, a message is generated that includes a link identifier that identifies an encapsulated TCP/IP protocol communication. In block 1670, the generated message is transmitted to a relay. In block 1675, an acknowledgment is received from the relay, the acknowledgment message identifying the link identifier previously included in the generated message. The AP may then transmit a TCP/IP ACK to any upstream device.

In another embodiment, a device that may be employed within a wireless communication system includes: means for generating a message including a link identifier that identifies an encapsulated TCP/IP protocol communication; means for transmitting the generated message to a relay; and means for receiving an acknowledgment message from the relay, the acknowledgment message including identifying the link identifier. The means for generating may include a processor, such as processor 204 in FIG. 2, or DSP, such as DSP 220 in FIG. 2. The means for generating may also include one or more of a processor, signal generator, transceiver, decoder, or a combination of hardware and/or software component(s), circuits, and/or module(s). The means for transmitting may include transmitter, such as transmitter 210 in FIG. 2. The means for transmitting may also include one or more of a processor, signal generator, transceiver, decoder, or a combination of hardware and/or software component(s), circuits, and/or module(s). The means for receiving may include receiver, such as receiver 212 in FIG. 2. The means for receiving may also include one or more of a processor, signal generator, transceiver, decoder, or a combination of hardware and/or software component(s), circuits, and/or module(s).

Figure 17A:
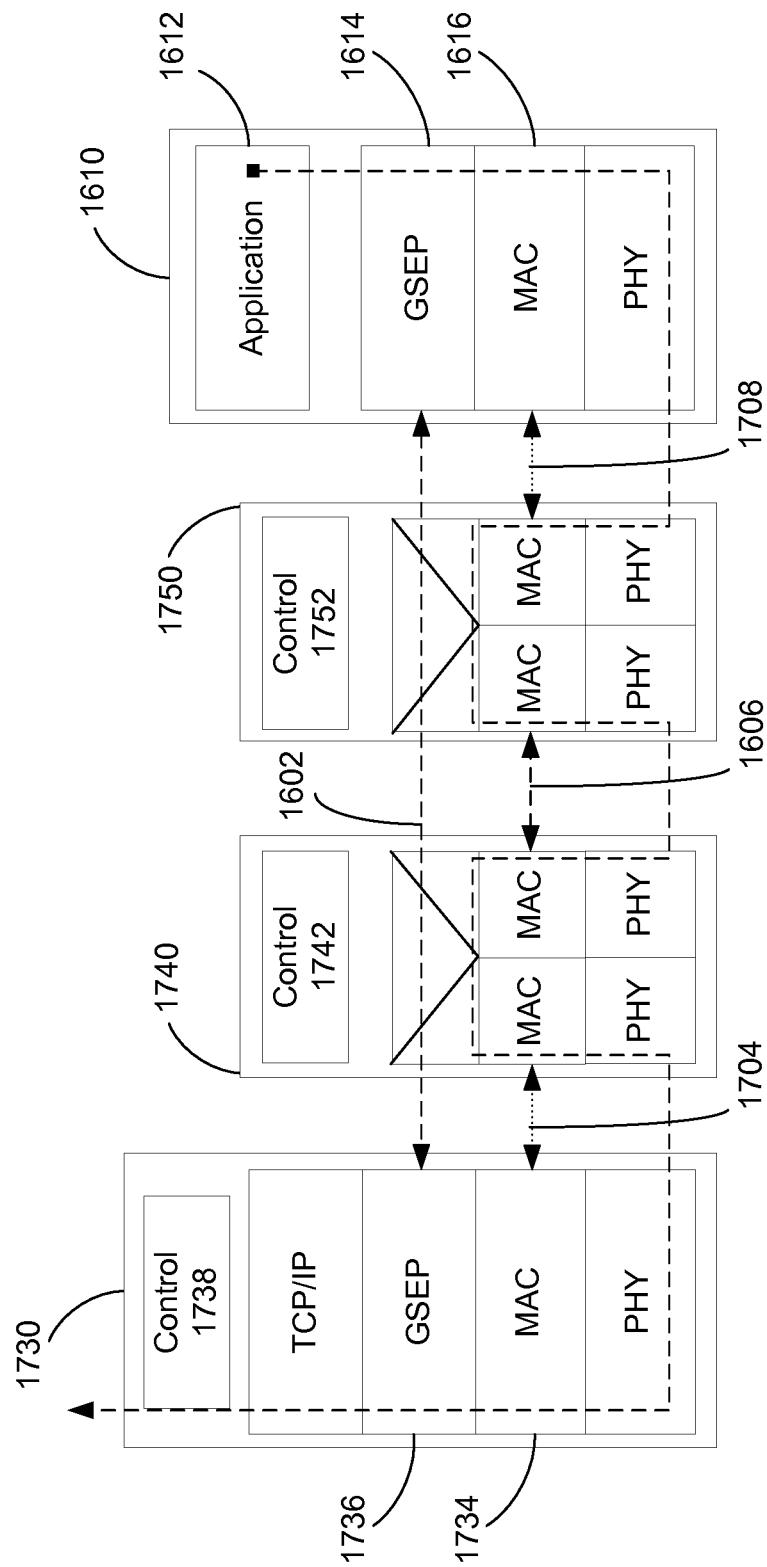
FIG. 17A depicts an exemplary GSEP sequencing and acknowledging technique for GSEP messages in a multi-hop wireless communication system with an AP TCP/IP proxy.

FIG. 17A depicts an exemplary GSEP sequencing and acknowledging technique for GSEP messages in a multi-hop wireless communication system with an AP TCP/IP proxy. In this embodiment, as in the previous, end-to-end link level sequencing and acknowledging is implemented between AP GSEP layer 1736 and STA GSEP layer 1614. Further, AP 1730 and relays 1740 and 1750 may include control modules 1738, 1742, and 1752, respectively, for managing local MAC level sequencing and acknowledging. Control module 1738 may be separate from or integrated with GSEP layer 1736. Similarly, control modules 1742 and 1752 may be implemented on relays 1740 and 1750 independent of any GSEP layer, or as part of a GSEP layer (not shown). Control modules 1738, 1742, and 1752 may be alternatively implemented via modification of the MAC layer on AP 1730 and relays 1740 and 1750. The control modules 1738, 1742, and 1752 are configured to selectively enable or disable local MAC layer sequencing and acknowledging. As depicted in FIG. 17A, MAC layer communication 1606 has sequencing and acknowledging enabled (dashed line). However, MAC communications 1704 and 1708 have had sequencing and acknowledging disabled (dotted line). The control modules may enable or disable the MAC layer sequencing and acknowledging by, for example, modifying a flag contained in a MAC header.

The control modules may be further configured to either continuously or periodically determine the health or reliability of the local link(s) (e.g., no intermediate hops). For example, a control module 1742 may monitor a received signal strength indicator (RSSI) associated with the communications link between relay 1740 and relay 1750 and, if the RSSI is below a threshold, enable local sequencing and acknowledging between relay 1740 and relay 1750. Alternatively, a control module may inspect the sequencing identifiers transmitted in the aforementioned end-to-end link level sequencing and acknowledging between AP GSEP layer 1736 and STA GSEP layer 1614. If the number of end-to-end retransmissions is below a threshold, the control module may disable local sequencing and acknowledging. As another example, a control module may periodically enable local link sequencing and acknowledging only to later disable it if the local retransmission rate is low. Of course, no single method of determining the health or reliability of the local link may be adequate, and thus some combination of the above techniques or other techniques may be implemented.

Figure 17B:
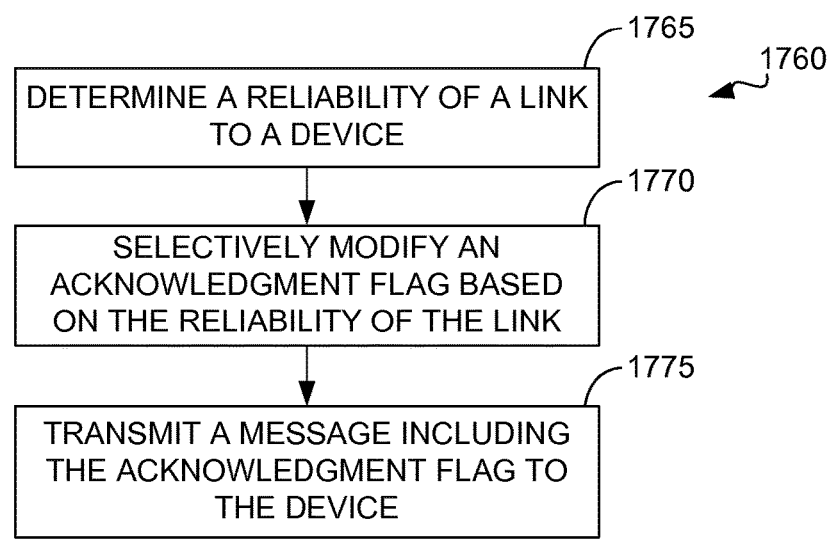
FIG. 17B is a flowchart of another exemplary method of sequencing and acknowledging GSEP messages in a multi-hop wireless communication system with an AP TCP/IP proxy.

FIG. 17B is a flowchart of another exemplary method 1760 of sequencing and acknowledging GSEP messages in a multi-hop wireless communication system with an AP TCP/IP proxy. In this embodiment, method 1760 may be executed by a processor residing in an AP, a relay, or another device in the communications link between the AP and a STA. In block 1765, the reliability of a link to a device is determined. In block 1770, an acknowledgment flag is selectively modified based on the reliability of the link, as determined in block 1765. The acknowledgment flag may be part of a MAC header appended to a particular transmission. At block 1775, a message including the acknowledgment flag is transmitted to the device.

In another embodiment, a device that may be employed within a wireless communication system includes: means for determining a reliability of a link to a device and to selectively modify an acknowledgment flag based on the reliability of the link; and means for transmitting a message including the acknowledgment flag to the device. The means for determining may include a signal detector, such as signal detector 218 in FIG. 2, alone or in combination with a processor or DSP. The means for determining may also include one or more of a processor, signal generator, transceiver, decoder, or a combination of hardware and/or software component(s), circuits, and/or module(s). The means for transmitting may include transmitter, such as transmitter 210 in FIG. 2. The means for transmitting may also include one or more of a processor, signal generator, transceiver, decoder, or a combination of hardware and/or software component(s), circuits, and/or module(s).

Figure 18A:
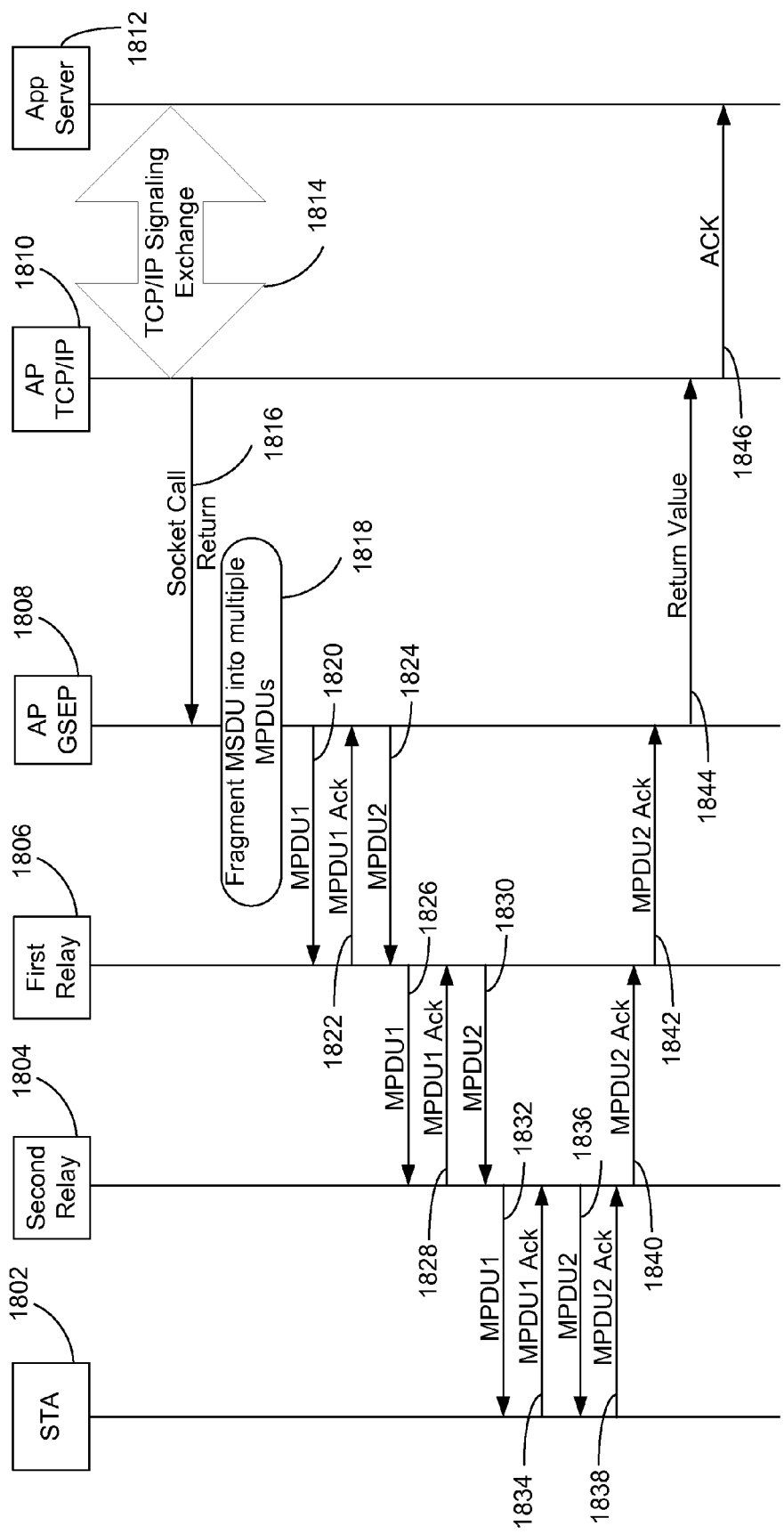
FIG. 18A is a signal flow diagram of an exemplary GSEP sequencing and acknowledging technique for GSEP messages in a multi-hop wireless communication system with an AP TCP/IP proxy.

FIG. 18A is a signal flow diagram of an exemplary GSEP sequencing and acknowledging technique for GSEP messages in a multi-hop wireless communication system with an AP TCP/IP proxy. In this embodiment, MAC layer fragmentation is exploited to carry an implicit end-to-end acknowledgment from a STA to an AP. Doing so minimizes the number of end-to-end messages (between AP and STA) transmitted. However, this may impose larger memory requirements on the relays as a last MAC protocol data unit (MPDU) is buffered until a downstream acknowledgment of the same is received. Like operation 622 in FIG. 6, operation 1814 indicates traditional TCP/IP communication between the AP TCP/IP layers 1810 and the application server 1812. Again, like in FIG. 6, at operation 1816, the socket call return is captured from the AP TCP/IP layers 1810 at the AP GSEP layer 1808. At operation 1818, the AP GSEP layer may fragment the MAC service data unit (MSDU) into a plurality of MPDUs, including a last MPDU having a MAC fragmentation subheader indicating it as the last. Alternatively, at operation 1818, the AP GSEP layer may not fragment the MSDU and instead simply set the indicator for the last fragment in the MAC subheader for the single transmission.

The remainder of FIG. 18A tracks the case where the GSEP layer fragments an MSDU into two MPDUs. At operation 1820, the AP GSEP layer 1808 transmits the first MPDU to the first relay 1806, which responds with an acknowledgment of the first MPDU at operation 1822. At operation 1824, the AP GSEP layer 1808 transmits the second MPDU (including the last fragment indicator in the MAC fragmentation subheader) to the first relay 1806 which, due to the last fragment indicator, holds off acknowledgment of the second MPDU until a downstream acknowledgment of the second MPDU is received. At operation 1826, the first relay 1806 transmits the first MPDU to the second relay 1804, which responds with an acknowledgment of the first MPDU at operation 1828. At operation 1830, the first relay 1806 transmits the second MPDU to the second relay 1804, which again holds of acknowledgment until it receives a downstream acknowledgment of the second MPDU. At operation 1832, the second relay 1804 transmits the first MPDU to STA 1802, which responds with an acknowledgment of the first MPDU at operation 1834. Note STA 1802 includes MAC/PHY layers, a GSEP layer, and an application layer (not shown). At operation 1836, the second relay 1804 transmits the second MPDU to STA 1802. Because STA 1802 is the destination of the transmission, at operation 1838 either the STA GSEP layer, STA MAC layer, or some other controller will cause an acknowledgment of the second MPDU to be sent to the second relay 1804. Now that the second relay 1804 has received acknowledgment of the second MPDU, at operation 1840 the second relay 1804 transmits acknowledgment of the second MPDU to the first relay 1806. Similarly, at operation 1842, the first relay 1806, having received acknowledgment of the second MPDU, transmits an acknowledgment of the second MPDU to the AP GSEP layer 1808. At operation 1844, the AP GSEP layer may then convert the received acknowledgment to a return value and returns the return value to the AP TCP/IP layers 1810. Finally, at operation 1846, the AP TCP/IP layers use this return value in order to send the TCP/IP ACK to the application server 1812.

Figure 18B:
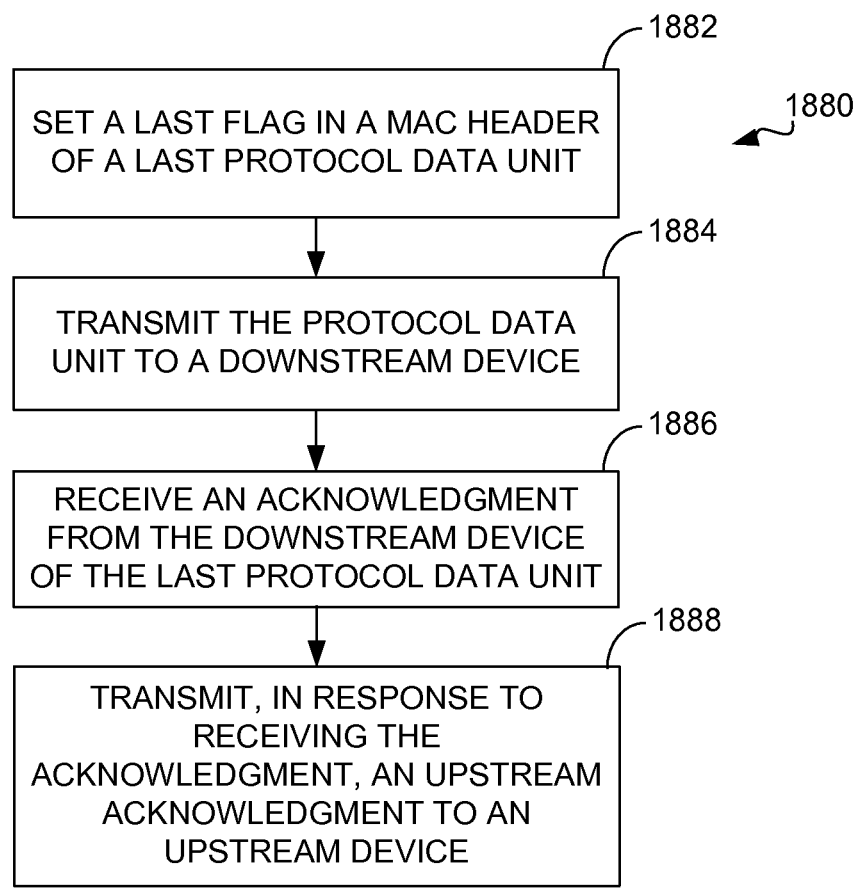
FIG. 18B is a flowchart of another exemplary method of sequencing and acknowledging GSEP messages in a multi-hop wireless communication system with an AP TCP/IP proxy.

FIG. 18B is a flowchart of another exemplary method 1880 of sequencing and acknowledging GSEP messages in a multi-hop wireless communication system with an AP TCP/IP proxy. In this embodiment, method 1880 may be executed by a processor residing in an AP. In block 1882, a last flag is set in the MAC header of a protocol data unit. The last flag may be set even if the protocol data unit is the only protocol data unit to be transmitted. In block 1884, the protocol data unit is transmitted to a downstream device. In block 1886, an acknowledgment of receipt of the protocol data unit is received from the downstream device. Finally, in block 1888, an upstream acknowledgment is transmitted to an upstream device in response to receiving the acknowledgment from the downstream device.

In another embodiment, a device that may be employed within a wireless communication system includes: means for setting a last flag in a header of a protocol data unit; and means for transmitting the protocol data unit to a downstream device and to transmit, in response to receiving an acknowledgment of the protocol data unit from the downstream device, an upstream acknowledgment to an upstream device. The means for setting may include a processor, such as processor 204 in FIG. 2, or DSP, such as DSP 220 in FIG. 2. The means for setting may also include one or more of a processor, signal generator, transceiver, decoder, or a combination of hardware and/or software component(s), circuits, and/or module(s). The means for transmitting may include transmitter, such as transmitter 210 in FIG. 2. The means for transmitting may also include one or more of a processor, signal generator, transceiver, decoder, or a combination of hardware and/or software component(s), circuits, and/or module(s).

As used herein, the terms "upstream" and "downstream" are not intended to suggest any fixed reference or direction of communication. An upstream device may be "upstream" to another device in one communication, but "downstream" to the another device in another communication.

As used herein, the terms "layer" and "layers" are abstractions and need not define distinct places for various functions.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating data in a wireless communications network, comprising:
    receiving, by an electronic device from an upstream device, an IP communication for a downstream device;
    generating, by the electronic device, a message including a link identifier that identifies an encapsulated form of the IP communication;
    transmitting, by the electronic device, the generated message to a relay; and
    receiving, by the electronic device, a media access control (MAC) level acknowledgment message from the relay, the acknowledgment message acknowledging receipt of the generated message by the different downstream device and including the link identifier; and
    transmitting an acknowledgment of the IP communication to the upstream device in response to receiving the media access control MAC level acknowledgment message from the relay.

2. The method of claim 1, further comprising:
    receiving a function call;
    converting the function call into the encapsulated IP communication; and
    wherein the generated message further includes the encapsulated IP communication.

3. The method of claim 1, wherein the generated message further includes a MAC layer identifier.

4. The method of claim 1, wherein the encapsulated IP communication is an encapsulated UDP communication.

5. The method of claim 1, wherein the encapsulated IP communication is an encapsulated HTTP communication.

6. The method of claim 1, further comprising:
    encapsulating separate portions of the IP communication into a plurality of messages and the generated message;
    transmitting the plurality of messages to the relay; and
    receiving a plurality of media access control level acknowledgements from the relay for the plurality of messages without transmitting an acknowledgment to the upstream device.

7. The method of claim 1, further comprising receiving a flow control message from the downstream device, the flow control message indicating the electronic device should pause transmissions to the downstream device.

8. The method of claim 6, wherein the flow control message indicates a time delay until transmissions to the downstream device may resume, the method further comprising resuming transmissions to the downstream device after the indicated time delay.

9. The method of claim 6, wherein the flow control message indicates a first segment of an encapsulated IP communication to transmit once transmissions to the downstream device resume the method further comprising resuming transmissions to the downstream device with the first segment.

10. The method of claim 6, further comprising receiving a resume message from the downstream device, the resume message indicating that transmission to the downstream device may resume upon reception of the resume message.

11. A device for communicating data in a wireless communications network, comprising:
    a receiver configured to receive from an upstream device, an IP communication for a downstream device;
    a processor configured to generate a message including a link identifier that identifies an encapsulated form of the IP communication;
    a transmitter configured to transmit the generated message to a relay, and
    wherein the receiver is further configured to receive a media access control (MAC) level acknowledgment message from the relay, the acknowledgment message acknowledging receipt of the generated message by the different downstream device and including identifying the link identifier, and
    wherein the transmitter is further configured to transmit, in response to receiving the media access control (MAC) level acknowledgment message an acknowledgment of the IP communication to the upstream device.

12. The device of claim 11, wherein the processor is further configured to
    receive a function call;

convert the function call into the encapsulated IP communication; and wherein the generated message further includes the encapsulated IP communication.

13. The device of claim 11, wherein the generated message further includes a MAC layer identifier.

14. The device of claim 11, wherein the encapsulated IP communication is an encapsulated UDP communication.

15. The device of claim 11, wherein the encapsulated IP communication is an encapsulated HTTP communication.

16. A non-transitory computer-readable medium comprising instructions that when executed by a computer cause the computer to perform a method of communicating in a wireless network, the method comprising:

receiving, by an electronic device from an upstream device, an IP communication for a downstream device;

generating, by the electronic device, a message including a link identifier that identifies an encapsulated form of the IP communication;

transmitting, by the electronic device, the generated message to a relay;

receiving, by the electronic device, a media access control (MAC) level acknowledgment message from the relay, the a media access control (MAC) level acknowledgment message acknowledging receipt of the generated message by the different downstream device and including identifying the link identifier; and transmitting by the electronic device an acknowledgment of the IP communication to the upstream device in response to receiving the media access control (MAC) level acknowledgment message from the relay.

17. A device for communicating data in a wireless communications network, comprising:

means for receiving, by an electronic device from an upstream device, an IP communication for a downstream device;

means for generating a message including a link identifier that identifies an encapsulated form of the IP communication;

means for transmitting the generated message to a relay;

means for receiving a media access control (MAC) level acknowledgment message from the relay, the media access control (MAC) level acknowledgment message acknowledging receipt of the generated message by the different downstream device and including identifying the link identifier; and means for transmitting by the electronic device an acknowledgment of the IP communication to the upstream device in response to receiving the media access control (MAC) level acknowledgment message from the relay.

* * * * *